United States Patent
Hsu et al.

(10) Patent No.: US 9,854,460 B2
(45) Date of Patent: Dec. 26, 2017

(54) TRANSMITTING DIRECT MODE COMMUNICATION APPARATUS, RECEIVING DIRECT MODE COMMUNICATION APPARATUS AND COMMUNICATION PATH SWITCHING METHOD THEREOF

(71) Applicant: Institute For Information Industry, Taipei (TW)

(72) Inventors: Chun-Yen Hsu, Taipei (TW); Chiu-Wen Chen, Taipei (TW); Feng-Ming Yang, Taipei (TW)

(73) Assignee: Institute For Information Industry, Taipei (TW)

( * ) Notice: Subject to any disclaimer, the term of this patent is extended or adjusted under 35 U.S.C. 154(b) by 158 days.

(21) Appl. No.: 14/134,061

(22) Filed: Dec. 19, 2013

(65) Prior Publication Data
US 2014/0211613 A1 Jul. 31, 2014

Related U.S. Application Data

(60) Provisional application No. 61/757,588, filed on Jan. 28, 2013.

(51) Int. Cl.
*H04W 24/04* (2009.01)
*H04L 12/24* (2006.01)
*H04W 76/04* (2009.01)

(52) U.S. Cl.
CPC ......... *H04W 24/04* (2013.01); *H04L 41/0663* (2013.01); *H04W 76/043* (2013.01)

(58) Field of Classification Search
None
See application file for complete search history.

(56) References Cited

U.S. PATENT DOCUMENTS 7,463,581 B1* 12/2008 Ellis et al. ............... 370/228
2003/0028818 A1* 2/2003 Fujita ....................... 714/4
(Continued)

FOREIGN PATENT DOCUMENTS

CN 1549613 A 11/2004
CN 102422703 A 4/2012
(Continued)

OTHER PUBLICATIONS

Raghothaman et al., U.S. Appl. No. 61/653,643, Specifications and Drawings, May 31, 2012, pp. 1-29.*
(Continued)

*Primary Examiner* — Gregory Sefcheck
*Assistant Examiner* — Suk Jin Kang
(74) *Attorney, Agent, or Firm* — Skaar Ulbrich Macari, P.A.

(57) ABSTRACT

A transmitting direct mode communication apparatus, a receiving direct mode communication apparatus and a communication path switching method thereof are provided. The transmitting direct mode communication apparatus and the receiving direct mode communication apparatus maintain a backend network connection, and communicate with each other via a direct communication connection. The transmitting direct mode communication apparatus and the receiving direct mode communication apparatus are capable of switching the communication to backend network connection rapidly and seamlessly for transmitting data normally after the direct communication connection failed.

3 Claims, 19 Drawing Sheets

(56) References Cited

U.S. PATENT DOCUMENTS

| | | | |
|---|---|---|---|
| 2003/0117950 A1* | 6/2003 | Huang | 370/220 |
| 2009/0310570 A1 | 12/2009 | Smith | |
| 2010/0278120 A1 | 11/2010 | Haddad et al. | |
| 2011/0032865 A1* | 2/2011 | Richardson | 370/316 |
| 2011/0041002 A1* | 2/2011 | Saavedra | 714/4 |
| 2013/0287012 A1* | 10/2013 | Pragada et al. | 370/338 |
| 2013/0297810 A1* | 11/2013 | Ho et al. | 709/228 |
| 2013/0324114 A1* | 12/2013 | Raghothaman et al. | 455/426.1 |
| 2014/0128092 A1 | 5/2014 | Xiong et al. | |
| 2014/0153390 A1* | 6/2014 | Ishii et al. | 370/230 |
| 2014/0254523 A1* | 9/2014 | Chai et al. | 370/329 |
| 2014/0274066 A1* | 9/2014 | Fodor et al. | 455/437 |
| 2014/0349659 A1* | 11/2014 | Ishii | 455/444 |
| 2015/0055608 A1* | 2/2015 | Egner et al. | 370/329 |
| 2015/0055621 A1* | 2/2015 | Koskinen | 370/331 |
| 2015/0063091 A1* | 3/2015 | Vesterinen et al. | 370/216 |
| 2015/0105082 A1* | 4/2015 | Cheng et al. | 455/436 |
| 2015/0117377 A1* | 4/2015 | Maaref et al. | 370/329 |
| 2015/0146687 A1* | 5/2015 | Kim et al. | 370/331 |
| 2015/0163789 A1* | 6/2015 | Vasudevan et al. | 370/259 |

FOREIGN PATENT DOCUMENTS

| | | |
|---|---|---|
| CN | 102598844 A | 7/2012 |
| CN | 102883440 A | 1/2013 |
| WO | 2008099171 A1 | 8/2008 |

OTHER PUBLICATIONS

Office Action to the corresponding Taiwan Patent Application rendered by Taiwan Intellectual Property Office (TIPO) dated Aug. 12, 2015, 14 pages.

Office Action to the corresponding Chinese Patent Application rendered by the State Intellectual Property Office of China (SIPO) dated Dec. 30, 2016, 6 pages.

* cited by examiner

TRANSMITTING DIRECT MODE COMMUNICATION APPARATUS, RECEIVING DIRECT MODE COMMUNICATION APPARATUS AND COMMUNICATION PATH SWITCHING METHOD THEREOF

This application claims the benefit of U.S. Provisional Application Ser. No. 61/757,588 filed on Jan. 28, 2013, which is hereby incorporated by reference in its entirety.

CROSS-REFERENCES TO RELATED APPLICATIONS

Not applicable.

BACKGROUND OF THE INVENTION

Field of the Invention

The present invention relates to a transmitting direct mode communication apparatus, a receiving direct mode communication apparatus and communication path switching methods thereof. More particularly, the transmitting direct mode communication apparatus, the receiving direct mode communication apparatus and the communication path switching methods thereof accomplish switching of the communication path in a lower layer.

Descriptions of the Related Art

In the conventional Long Term Evolution (LTE) network technology, mobile apparatuses can communicate with each other directly through a specific protocol. For the direct mode communication apparatuses in such a direct mode communication system, firstly infrastructure connections are created via a backend network and then, when the direct mode communication apparatuses enter into each other's communication coverage and create direct communication connections therebetween, data can be exchanged via the direct mode communication connection.

Further speaking, a mobile apparatus which is to transmit data in an LTE network must categorize the data packets through use of a packet filter and, according to one of a source address, a source TCP/UDP port number, a destination address, a destination TCP/UDP port number of each packet and a combination thereof, determine a quality of service (QoS) of the data packets and determine which data radio bearer will be used for data transmission. It should be noted that, in LTE network, the mobile apparatus may have many activated packet filters at the same time, and these packet filters are usually collectively termed as Traffic Flow Template.

Unfortunately, in LTE network, direct mode connection is less stable than backend network connection. Therefore, data must still be transmitted via the infrastructure connection of the backend network when the direct communication connection between the direct mode communication apparatuses is interrupted. However, no primary connection switching mechanism is available in the conventional technology, so usually the infrastructure connection of the backend network must be reactivated in order to continue the data transmission when the direct communication connection between the direct mode communication apparatuses is interrupted.

Moreover, although management of communications across connections between the direct mode communication apparatuses can be accomplished by the application-layer session initiation protocol, the procedure is very complex and packet loss tends to occur due to long communication interruption time during the connection switching.

Accordingly, there is an urgent need in the art to provide a solution capable of switching the connection between direct mode communication apparatuses in the LTE network technology while avoiding the shortcomings of the complex connection switching procedure and the long interruption time during the connection switching

SUMMARY OF THE INVENTION

The primary objective of the present invention is to provide a communication path switching method for a transmitting direct mode communication apparatus. The transmitting direct mode communication apparatus comprises a packet processing module and a transceiver, and maintains a backend network connection with a receiving direct mode communication apparatus via a backend network server. The communication path switching method comprises: (a) enabling the packet processing module to create a direct communication connection with the receiving direct mode communication apparatus via the transceiver; (b) enabling the packet processing module to determine that the direct communication connection is interrupted; and (c) enabling the packet processing module to switch the communication with the receiving direct mode communication apparatus from the direct communication connection to the backend network connection.

To achieve the aforesaid objective, the present invention further provides a transmitting direct mode communication apparatus, which maintains a backend network connection with a receiving direct mode communication apparatus via a backend network server. The transmitting direct mode communication apparatus comprises a transceiver and a packet processing module. The packet processing module is configured to create a direct communication connection with the receiving direct mode communication apparatus via the transceiver. The packet processing module is further configured to determine that the direct communication connection is interrupted and, through the transceiver, switch the communication with the receiving direct mode communication apparatus from the direct communication connection to the backend network connection.

To achieve the aforesaid objective, the present invention further provides a communication path switching method for a receiving direct mode communication apparatus. The receiving direct mode communication apparatus comprises a packet processing module and a transceiver, and maintains a backend network connection with a transmitting direct mode communication apparatus via a backend network server. The communication path switching method comprises: (a) enabling the packet processing module to create a direct communication connection with the transmitting direct mode communication apparatus via the transceiver; and (b) enabling the packet processing module to communicate with the transmitting direct mode communication apparatus via the backend network connection after the direct communication connection is interrupted.

To achieve the aforesaid objective, the present invention further provides a receiving direct mode communication apparatus, which maintains a backend network connection with a transmitting direct mode communication apparatus via a backend network server. The receiving direct mode communication apparatus comprises a transceiver and a packet processing module. The packet processing module is configured to create a direct communication connection with the transmitting direct mode communication apparatus via the transceiver, and communicate with the transmitting direct mode communication apparatus via the backend network connection after the direct communication connection is interrupted.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
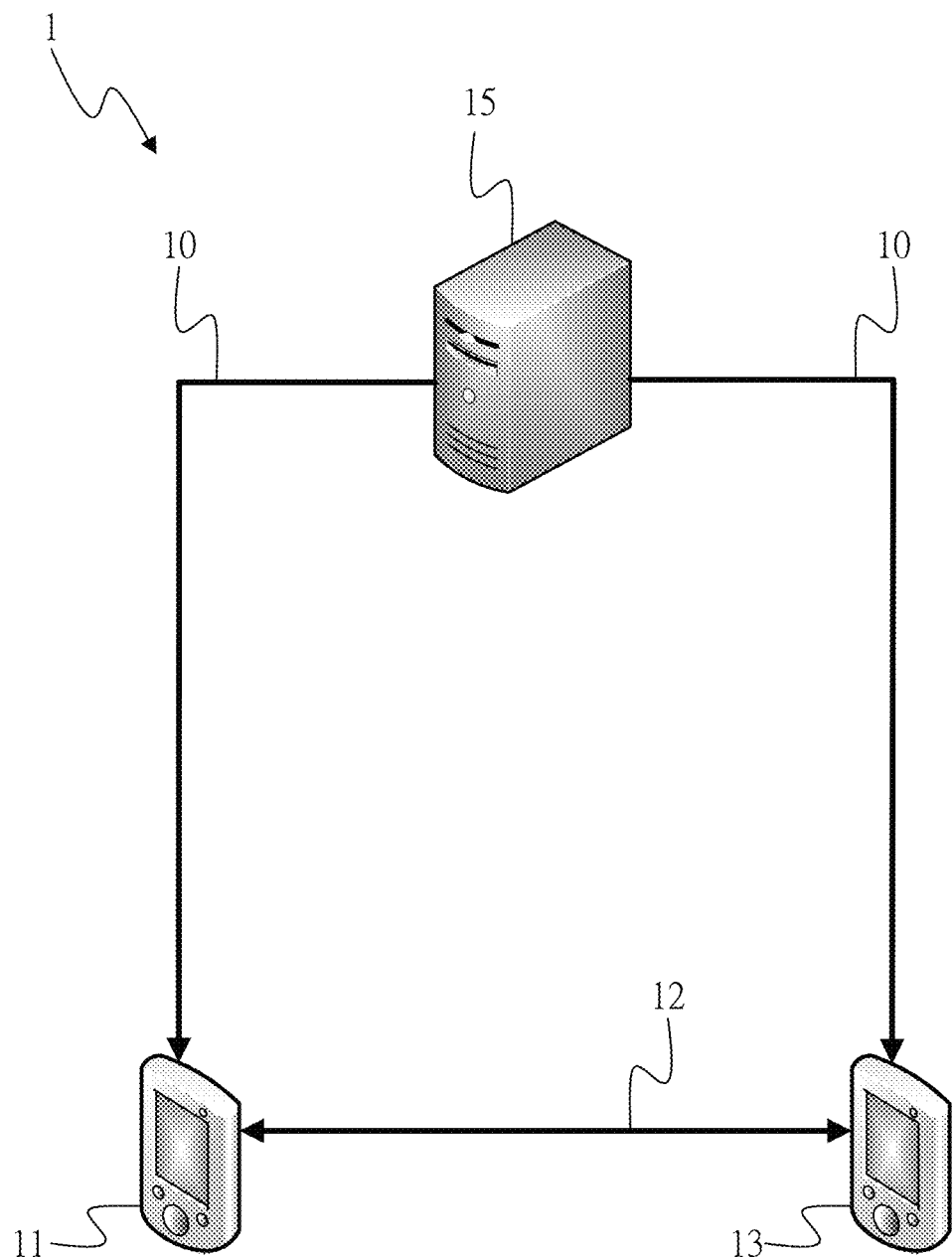
FIG. 1A is a schematic view of a direct mode communication system according to a first embodiment of the present invention.
Figure 1B:
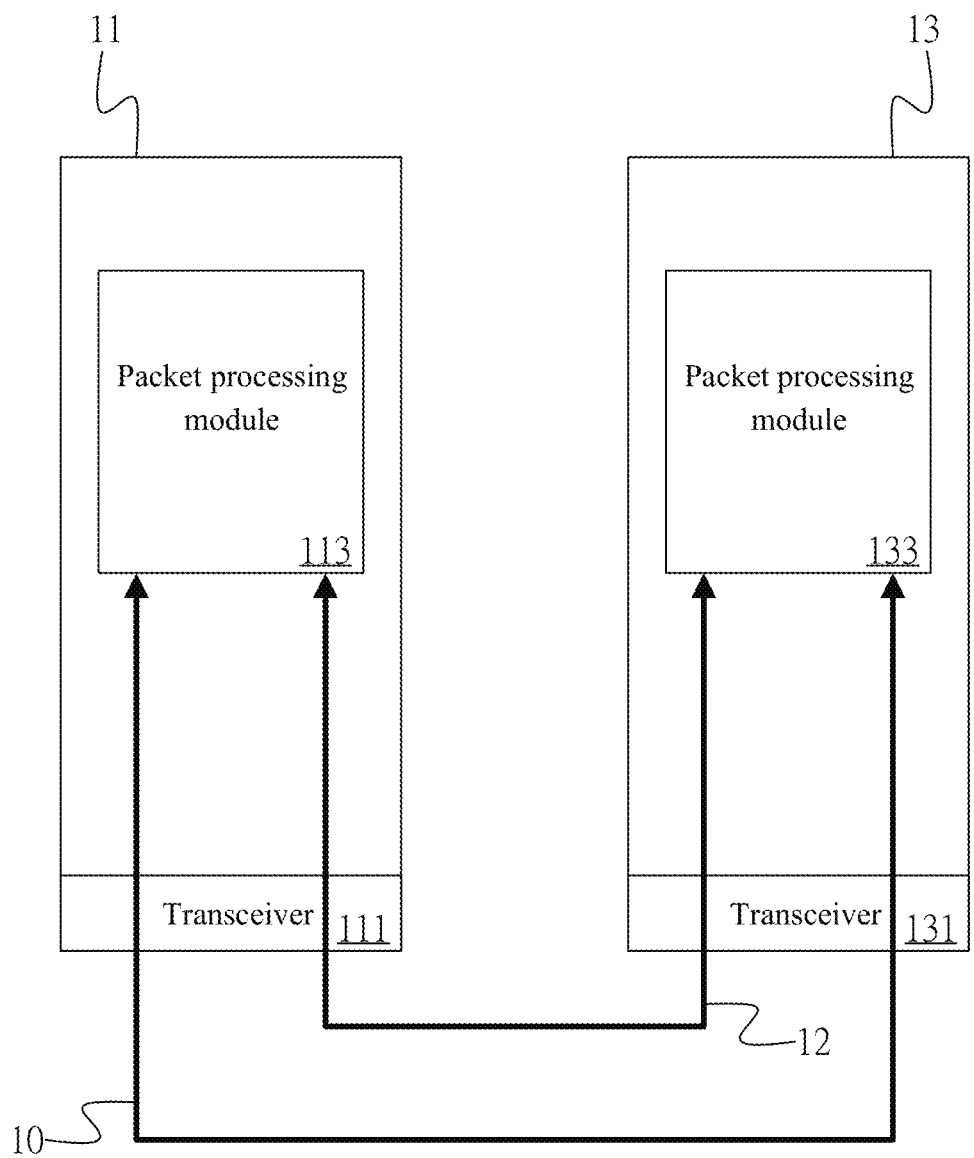
FIG. 1B is a block diagram of a transmitting direct mode communication apparatus and a receiving direct mode communication apparatus according to the first embodiment of the present invention.

Refer to FIG. 1A and FIG. 1B together. FIG. 1A is a schematic view of a direct mode communication system 1 according to a first embodiment of the present invention. The direct mode communication system 1 comprises a transmitting direct mode communication apparatus 11, a receiving direct mode communication apparatus 13 and a backend network server 15. The transmitting direct mode communication apparatus 11 maintains a backend network connection 10 with the receiving direct mode communication apparatus 13 via the backend network server 15.

FIG. 1B is a block diagram of the transmitting direct mode communication apparatus 11 and the receiving direct mode communication apparatus 13 according to the first embodiment of the present invention. The transmitting direct mode communication apparatus 11 comprises a transceiver 111 and a packet processing module 113. The receiving direct mode communication apparatus 13 comprises a transceiver 131 and a packet processing module 133. Interactions among the individual elements will be further described hereinbelow.

Firstly, the packet processing module 113 of the transmitting direct mode communication apparatus 11 creates a direct communication connection 12 with the receiving direct mode communication apparatus 13 via the transceiver 111. In other words, the packet processing module 133 of the receiving direct mode communication apparatus 13 creates the direct communication connection 12 with the transmitting direct mode communication apparatus 11 via the transceiver 113. Then, when the direct communication connection 12 between the transmitting direct mode communication apparatus 11 and the receiving direct mode communication apparatus 13 is interrupted due to external factors, the packet processing module 113 of the transmitting direct mode communication apparatus 11 can directly detect and determine that the direct communication connection 12 is interrupted.

Then, the packet processing module 113 of the transmitting direct mode communication apparatus 11 can switch the communication of the transmitting direct mode communication apparatus 11 and the receiving direct mode communication apparatus 13 from the direct communication connection 12 back to the backend network connection 10 that has already been created. On the other hand, the packet processing module 131 of the receiving direct mode communication apparatus 13 communicates with the transmitting direct mode communication apparatus 11 via the backend network connection 10 when the direct communication connection 12 is interrupted. In this way, switching of the connection can be achieved between the direct mode communication apparatuses to maintain continuity of the data transmission.

It shall be particularly appreciated that, in the first embodiment, the receiving direct mode communication apparatus 13 can switch the communication with the transmitting direct mode communication apparatus 11 from the direct communication connection 12 back to the backend network connection 10 via the packet processing module 131. Further, the receiving direct mode communication apparatus 13 may also set two internal packet processing paths therein, and then determine a processing path of the packet according to a logical channel ID (LCID) that is set in a Media Access Control (MAC) Layer header. Therefore, network packets incoming from either of the connections (the direct communication connection and the backend network connection) can be collected and then processed together. However, what described above is not intended to limit the way in which the receiving direct mode communication apparatus of the present invention processes the packet.

Figure 2A:
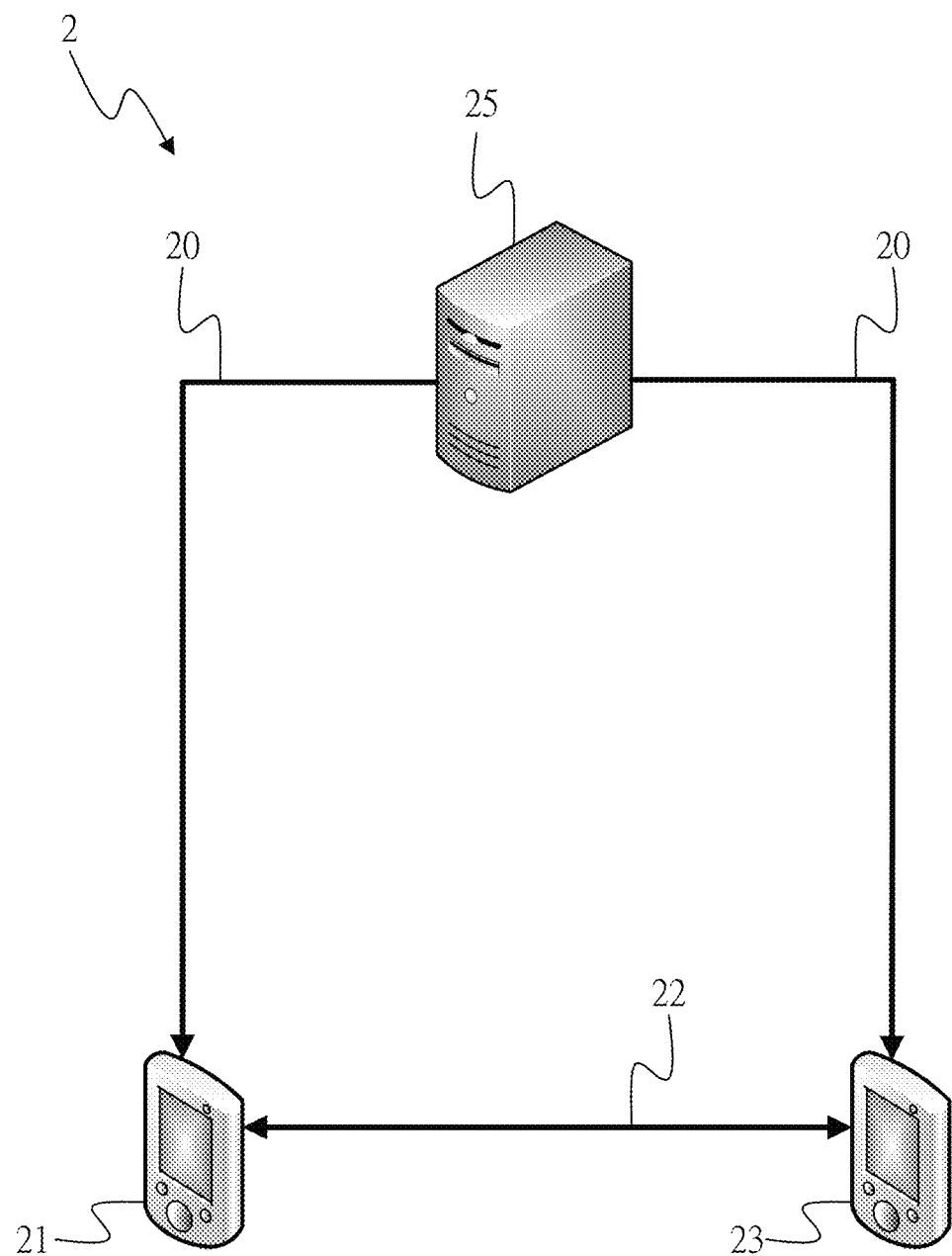
FIG. 2A is a schematic view of a direct mode communication system according to a second embodiment of the present invention.
Figure 2B:
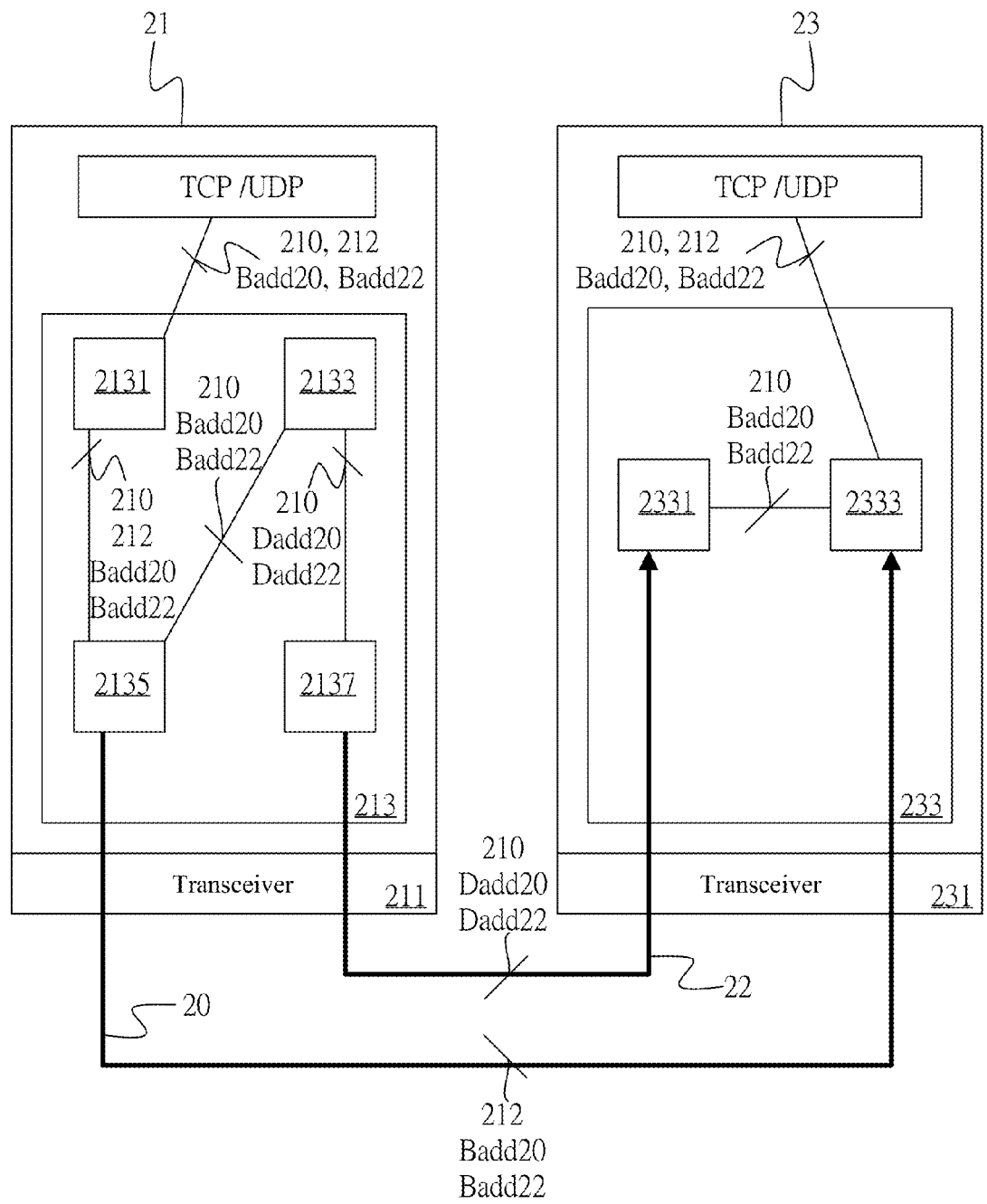
FIG. 2B is a block diagram of a transmitting direct mode communication apparatus and a receiving direct mode communication apparatus according to the second embodiment of the present invention.

Referring to FIG. 2A and FIG. 2B together. FIG. 2A is a schematic view of a direct mode communication system 2 according to a second embodiment of the present invention. The direct mode communication system 2 comprises a transmitting direct mode communication apparatus 21, a receiving direct mode communication apparatus 23 and a backend network server 25. The transmitting direct mode communication apparatus 21 maintains a backend network connection 20 with the receiving direct mode communication apparatus 23 via the backend network server 25.

FIG. 2B is a block diagram of the transmitting direct mode communication apparatus 21 and the receiving direct mode communication apparatus 23 according to the second embodiment of the present invention. The transmitting direct mode communication apparatus 21 comprises a transceiver 211 and a packet processing module 213. The packet processing module 213 further comprises a backend network address processing unit 2131, a direct mode communication network address processing unit 2133, a backend network traffic filter template (TFT) processing unit 2135 and a direct mode communication network TFT processing unit 2137.

On the other hand, the receiving direct mode communication apparatus 23 comprises a transceiver 231 and a packet processing module 233. The packet processing module 233 further comprises a backend network address processing unit 2333 and a direct mode communication network address processing unit 2331. The second embodiment mainly details the packet transmission and switching processes for a connection of a different form. Interactions among the individual elements will be further described hereinbelow.

Firstly, the packet processing module 213 of the transmitting direct mode communication apparatus 21 creates a direct communication connection 22 with the receiving direct mode communication apparatus 23 via the transceiver 211. In other words, the packet processing module 233 of the receiving direct mode communication apparatus 23 creates the direct communication connection 22 with the transmitting direct mode communication apparatus 21 via the transceiver 213.

Then, before a first network packet 210 is transmitted by the transmitting direct mode communication apparatus 21 to the receiving direct mode communication apparatus 23, the backend network address processing unit 2131 of the transmitting direct mode communication apparatus 21 receives the first network packet 210 from the TCP/UDP layer and transmits internally the first network packet 210 to the backend network TFT processing unit 2135. The first network packet 210 comprises a backend network source address Badd20 and a backend network destination address Badd22.

Next, the backend network TFT processing unit 2135 internally forwards the first network packet 210 to the direct mode communication network address processing unit 2133. Then, the backend network source address Badd20 and the backend network destination address Badd22 of the first network packet 210 are transformed by the direct mode communication network address processing unit 2133 into a direct mode communication network source address Dadd20 and a direct mode communication network destination address Dadd22 respectively.

After the network addresses of the first network packet 210 have been transformed by the direct mode communication network address processing unit 2133, the direct mode communication network TFT processing unit 2137 transmits the first network packet 210 to the receiving direct mode communication apparatus 23 through the transceiver 211 and via the direct communication connection 22 according to one of the direct mode communication network source address Dadd20, the direct mode communication network destination address Dadd22 and a combination thereof (i.e., according to the direct mode communication network source address Dadd20 or the direct mode communication network destination address Dadd22 separately or according to a combination of the both).

On the other hand, the direct mode communication network address processing unit 2331 of the receiving direct mode communication apparatus 23 receives the first network packet 210 from the transmitting direct mode communication apparatus 21 through the transceiver 231 and via the direct mode communication connection 22, and transforms the direct mode communication network source address Dadd20 and the direct mode communication network destination address Dadd22 of the first network packet 210 into the backend network source address Badd20 and the backend network destination address Badd22 respectively.

After the network addresses of the first network packet 210 have been processed by the direct mode communication network address processing unit 2331, the backend network address processing unit 2333 analyzes the first network packet 210 according to one of the backend network source address Badd20, the backend network destination address Badd22 and a combination thereof (i.e., according to the backend network source address Badd20 or the backend network destination address Badd22 separately or according to a combination of the both) and forwards the first network packet 210 to the TCP/UDP layer for subsequent processing.

Then when the packet processing module 213 of the transmitting direct mode communication apparatus 21 detects and determines that the direct communication connection 22 is interrupted and the transmitting direct mode communication apparatus 21 is to transmit a second network packet 212 to the receiving direct mode communication apparatus 23, the backend network address processing unit 2131 of the transmitting direct mode communication apparatus 21 transmits the second network packet 212 to the backend network TFT processing unit 2135. Similarly, the second network packet 212 comprises the backend network source address Badd20 and the backend network destination address Badd22.

Because the direct communication connection 22 has been interrupted, the backend network TFT processing unit 2135 of the transmitting direct mode communication apparatus 21 transmits the second network packet 212 to the receiving direct mode communication apparatus 23 through the transceiver 211 and via the backend network connection 20 according to one of the backend network source address Badd20, the backend network destination address Badd22 and a combination thereof (i.e., according to the backend network source address Badd20 or the backend network destination address Badd22 separately or according to a combination of the both).

Similarly, after the direct communication connection 22 is interrupted, the backend network address processing unit 2333 of the receiving direct mode communication apparatus 23 receives the second network packet 212 from the transmitting direct mode communication apparatus 21 through the transceiver 231 and via the backend network connection 20, and analyzes the second network packet 212 according to one of the backend network source address Badd20, the backend network destination address Badd22 and a combination thereof (i.e., according to the backend network source address Badd20 or the backend network destination address Badd22 separately or according to a combination of the both) directly. Then, the second network packet 212 is forwarded to the TCP/UDP layer for subsequent processing.

It shall be particularly appreciated that, besides the source address and the destination address, the network packet of the aforesaid embodiment may also comprise related information such as a source network address port number and a destination network address port number; and appropriate use of network information will be readily appreciated by those skilled in the art upon reviewing the aforesaid descriptions.

In addition, in LTE network, the above address translation method is usually IP-in-IP Tunneling method or Network Address Translation (NAT) method. In NAT method, the source address, the destination address, the source network address port number and the destination network address port number may be changed after the packets are translated. However, it is not to limit or influence the present invention no matter IP-in-IP Tunneling method or NAT method is applied (or any possible address translation method).

Figure 3A:
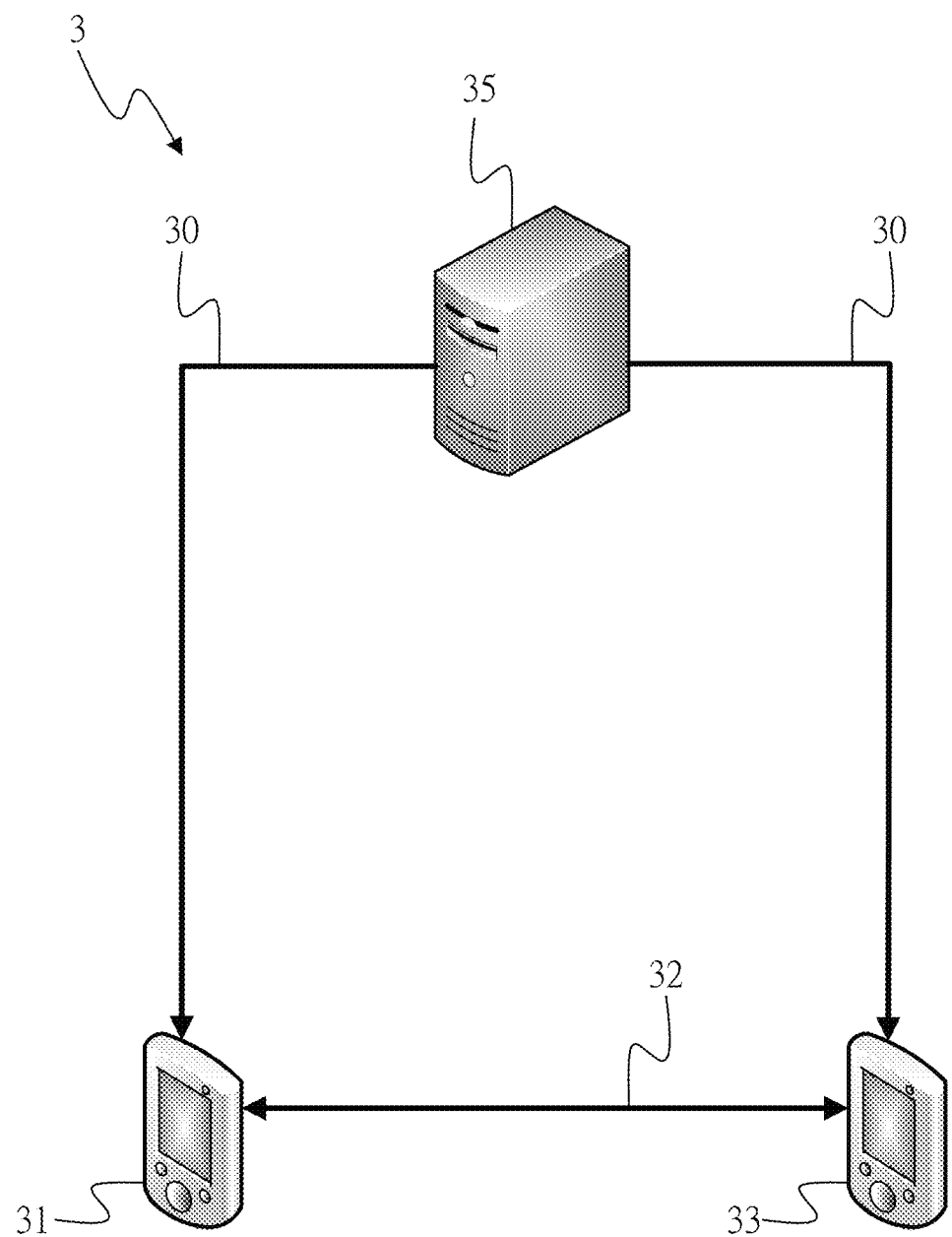
FIG. 3A is a schematic view of a direct mode communication system according to a third embodiment of the present invention.
Figure 3B:
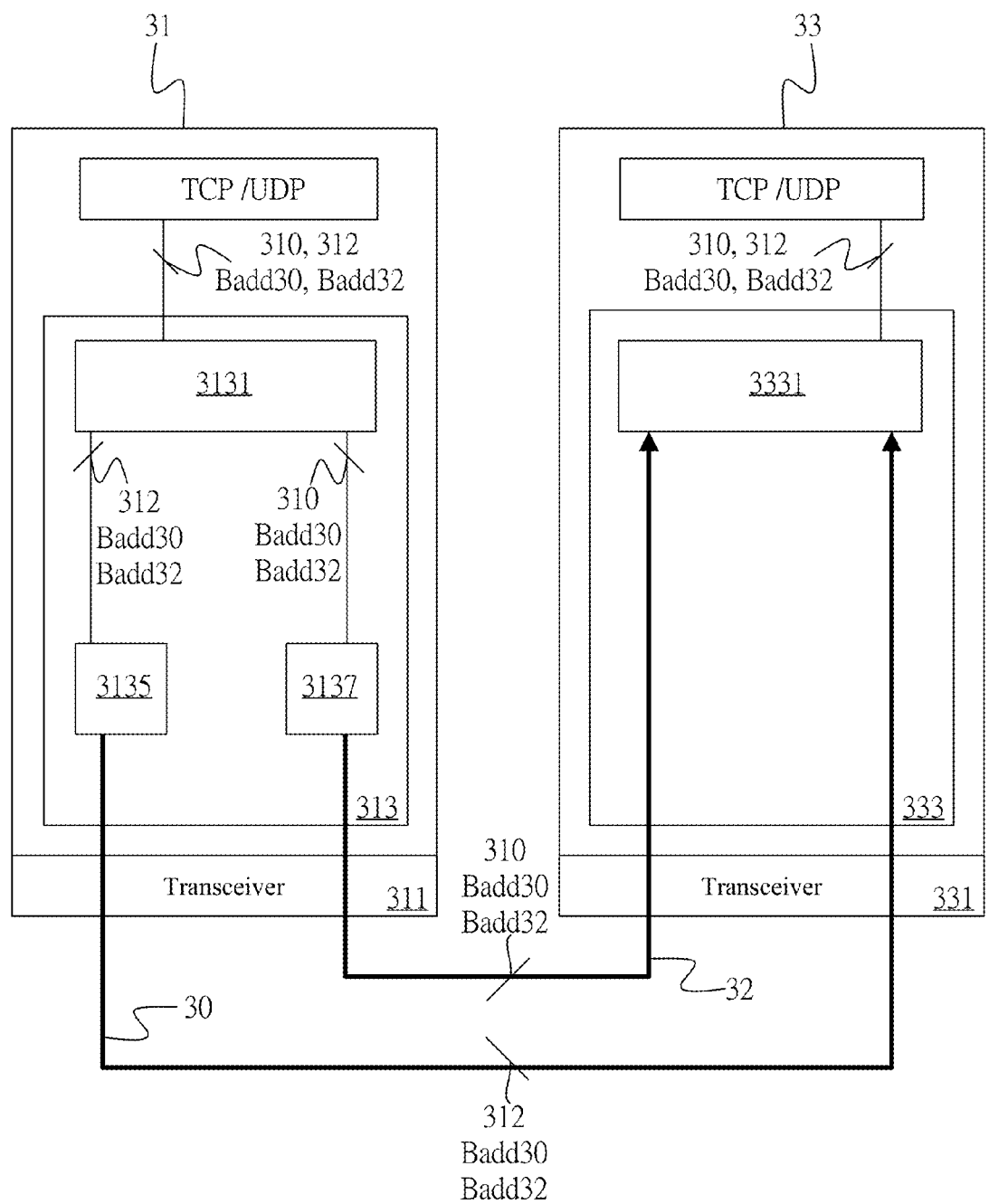
FIG. 3B is a block diagram of a transmitting direct mode communication apparatus and a receiving direct mode communication apparatus according to the third embodiment of the present invention.

Refer to FIG. 3A and FIG. 3B together. FIG. 3A is a schematic view of a direct mode communication system 3 according to a third embodiment of the present invention. The direct mode communication system 3 comprises a transmitting direct mode communication apparatus 31, a receiving direct mode communication apparatus 33 and a backend network server 35. The transmitting direct mode communication apparatus 31 maintains a backend network connection 30 with the receiving direct mode communication apparatus 33 via the backend network server 35.

FIG. 3B is a block diagram of the transmitting direct mode communication apparatus 31 and the receiving direct mode communication apparatus 33 according to the third embodiment of the present invention. The transmitting direct mode communication apparatus 31 comprises a transceiver 311 and a packet processing module 313. The packet processing module 313 further comprises a network address processing unit 3131, a backend network TFT processing unit 3135 and a direct mode communication network TFT processing unit 3137.

On the other hand, the receiving direct mode communication apparatus 33 comprises a transceiver 331 and a packet processing module 333. The packet processing module 333 further comprises a backend network address processing unit 3331. The third embodiment mainly details the packet transmission and switching processes for a connection of a different form. Interactions among the individual elements will be further described hereinbelow.

Firstly, the packet processing module 313 of the transmitting direct mode communication apparatus 31 creates a direct communication connection 32 with the receiving direct mode communication apparatus 33 via the transceiver 311. In other words, the packet processing module 333 of the receiving direct mode communication apparatus 33 creates the direct communication connection 32 with the transmitting direct mode communication apparatus 31 via the transceiver 313.

Then, before a first network packet 310 is transmitted by the transmitting direct mode communication apparatus 31 to the receiving direct mode communication apparatus 33, the backend network address processing unit 3131 of the transmitting direct mode communication apparatus 31 receives the first network packet 310 from the TCP/UDP layer and transmits internally the first network packet 310 to the direct mode communication network TFT processing unit 3137. The first network packet 310 comprises a backend network source address Badd30 and a backend network destination address Badd32.

Then, the direct mode communication network TFT processing unit 3137 transmits the first network packet 310 to the receiving direct mode communication apparatus 33 through the transceiver 311 and via the direct communication connection 32 according to one of the backend network source address Badd30, the backend network destination address Badd32 and a combination thereof (i.e., according to the backend network source address Badd30 or the backend network destination address Badd32 separately or according to a combination of the both).

On the other hand, the backend network address processing unit 3331 of the receiving direct mode communication apparatus 33 receives the first network packet 310 from the transmitting direct mode communication apparatus 31 through the transceiver 331 and via the direct mode communication connection 32, analyzes the first network packet 310 according to one of the backend network source address Badd30, the backend network destination address Badd32 and a combination thereof (i.e., according to the backend network source address Badd30 or the backend network destination address Badd32 separately or according to a combination of the both) and forwards the first network packet 310 to the TCP/UDP layer for subsequent processing.

Then when the packet processing module 313 of the transmitting direct mode communication apparatus 31 detects and determines that the direct communication connection 32 is interrupted and the transmitting direct mode communication apparatus 31 is to transmit a second network packet 312 to the receiving direct mode communication apparatus 33, the backend network address processing unit 3131 of the transmitting direct mode communication apparatus 31 transmits the second network packet 312 to the backend network TFT processing unit 3135. Similarly, the second network packet 312 comprises the backend network source address Badd30 and the backend network destination address Badd32.

Because the direct communication connection 32 has been interrupted, the backend network TFT processing unit 3135 of the transmitting direct mode communication apparatus 31 transmits the second network packet 312 to the receiving direct mode communication apparatus 33 through the transceiver 311 and via the backend network connection 30 according to one of the backend network source address Badd30, the backend network destination address Badd32 and a combination thereof (i.e., according to the backend network source address Badd30 or the backend network destination address Badd32 separately or according to a combination of the both).

Similarly, after the direct communication connection 32 is interrupted, the backend network address processing unit 3331 of the receiving direct mode communication apparatus 33 receives the second network packet 312 from the transmitting direct mode communication apparatus 31 through the transceiver 331 and via the backend network connection 30, analyzes the second network packet 312 according to one of the backend network source address Badd30, the backend network destination address Badd32 and a combination thereof (i.e., according to the backend network source address Badd30 or the backend network destination address Badd32 separately or according to a combination of the both) directly, and forwards the second network packet 312 to the TCP/UDP layer for subsequent processing.

It shall be particularly appreciated that, in the third embodiment, both the backend network address processing unit 3131 of the transmitting direct mode communication apparatus 31 and the backend network address processing unit 3331 of the receiving direct mode communication apparatus 33 have the capability of multi-homed IP processing so that network addresses can be transformed when the backend network source address Badd30 and the backend network destination address Badd32 belong to different domains.

Figure 4A:
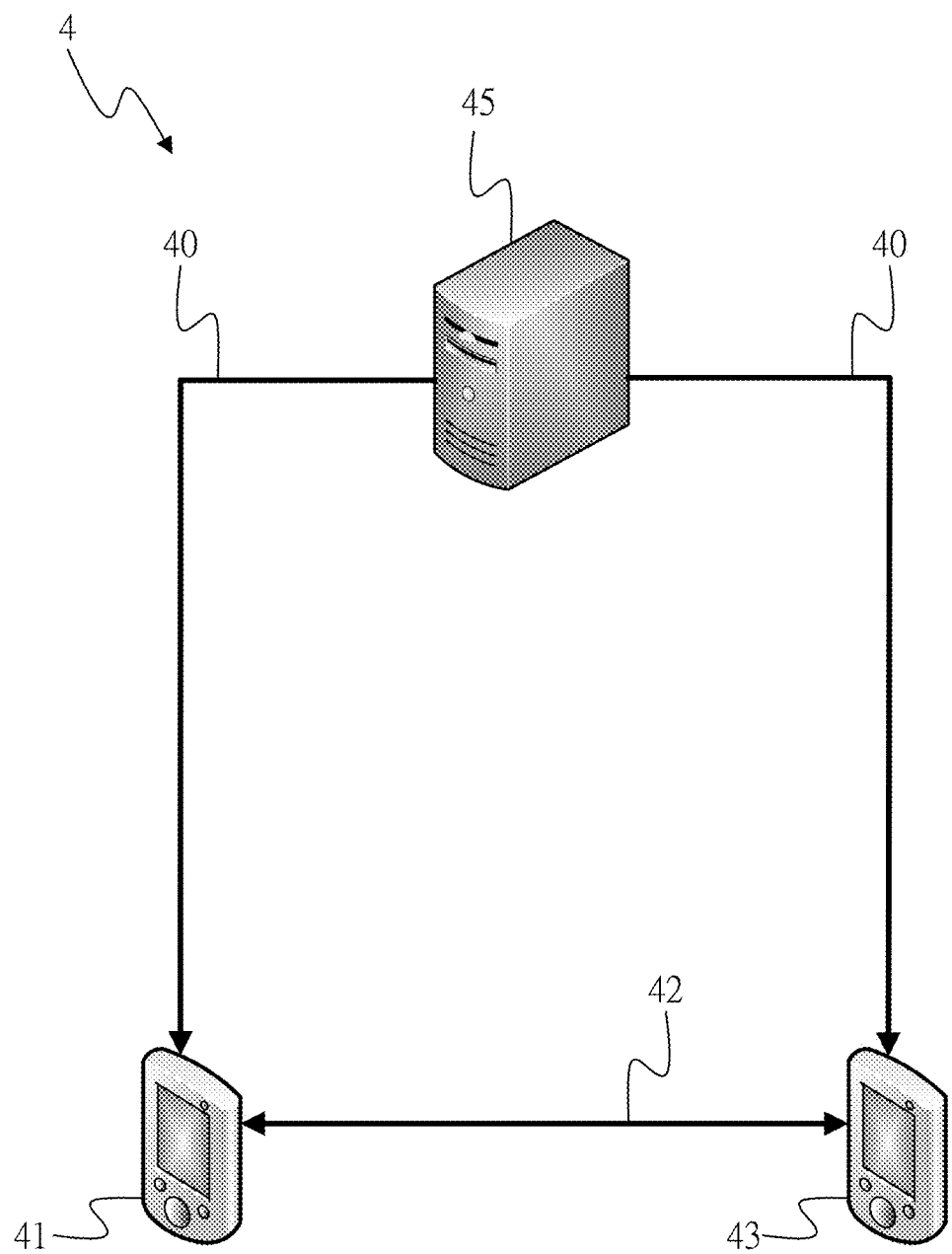
FIG. 4A is a schematic view of a direct mode communication system according to a fourth embodiment of the present invention.
Figure 4B:
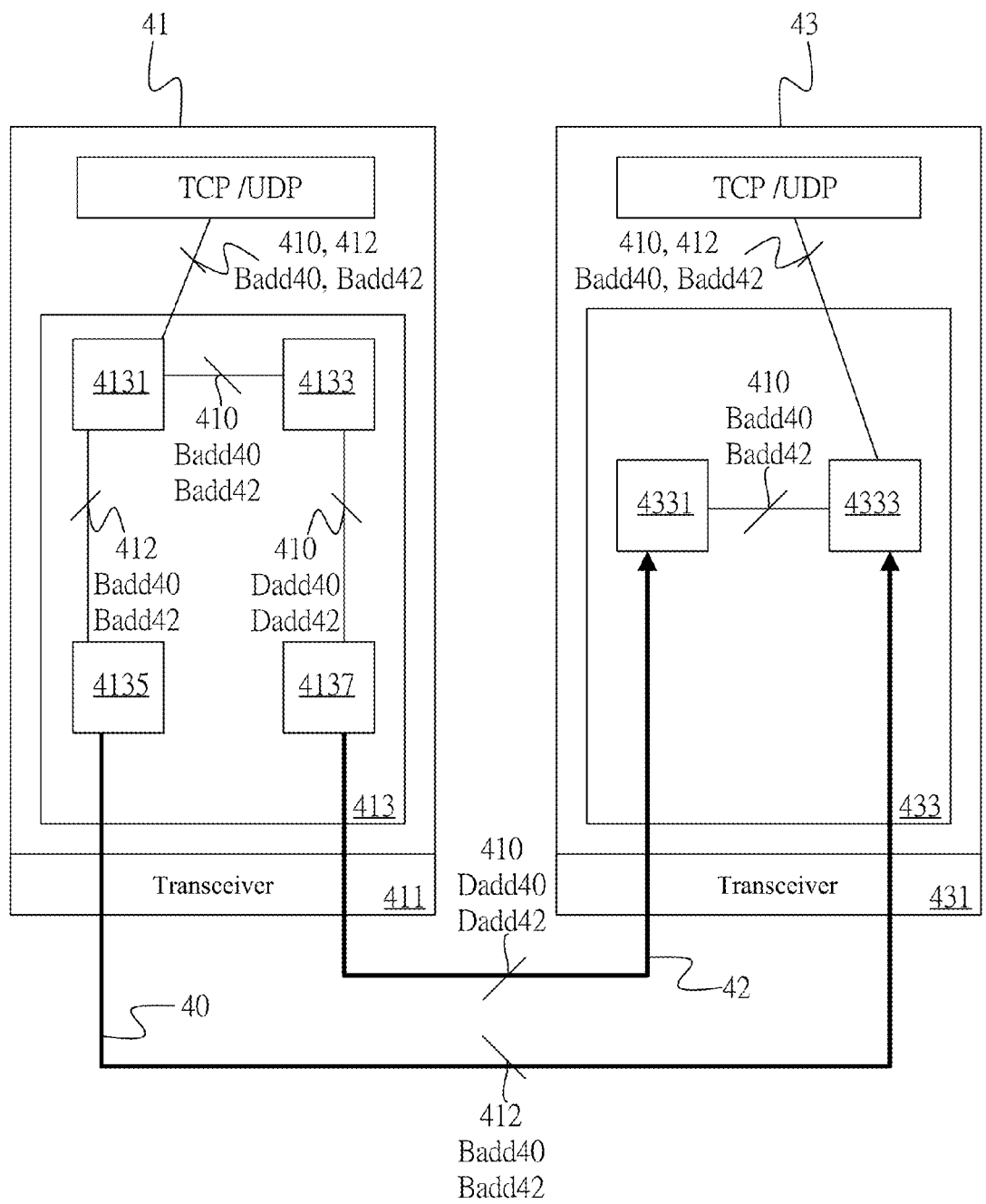
FIG. 4B is a block diagram of a transmitting direct mode communication apparatus and a receiving direct mode communication apparatus according to the fourth embodiment of the present invention.

Refer to FIG. 4A and FIG. 4B together. FIG. 4A is a schematic view of a direct mode communication system 4 according to a fourth embodiment of the present invention. The direct mode communication system 4 comprises a transmitting direct mode communication apparatus 41, a receiving direct mode communication apparatus 43 and a backend network server 45. The transmitting direct mode communication apparatus 41 maintains a backend network connection 40 with the receiving direct mode communication apparatus 43 via the backend network server 45.

FIG. 4B is a block diagram of the transmitting direct mode communication apparatus 41 and the receiving direct mode communication apparatus 43 according to the fourth embodiment of the present invention. The transmitting direct mode communication apparatus 41 comprises a transceiver 411 and a packet processing module 413. The packet processing module 413 further comprises a backend network address processing unit 4131, a direct mode communication network address processing unit 4133, a backend network TFT processing unit 4135 and a direct mode communication network TFT processing unit 4137.

On the other hand, the receiving direct mode communication apparatus 43 comprises a transceiver 431 and a packet processing module 433. The packet processing module 433 further comprises a backend network address processing unit 4333 and a direct mode communication network address processing unit 4331. The fourth embodiment mainly details the packet transmission and switching processes for a connection of a different form. Interactions among the individual elements will be further described hereinbelow.

Firstly, the packet processing module 413 of the transmitting direct mode communication apparatus 41 creates a direct communication connection 42 with the receiving direct mode communication apparatus 43 via the transceiver 411. In other words, the packet processing module 433 of the receiving direct mode communication apparatus 43 creates the direct communication connection 42 with the transmitting direct mode communication apparatus 41 via the transceiver 413.

Then, before a first network packet 410 is transmitted by the transmitting direct mode communication apparatus 41 to the receiving direct mode communication apparatus 43, the backend network address processing unit 4131 of the transmitting direct mode communication apparatus 41 receives the first network packet 410 from the TCP/UDP layer and transmits internally the first network packet 410 to the direct mode communication network address processing unit 4133. The first network packet 410 comprises a backend network source address Badd40 and a backend network destination address Badd42.

Then, the backend network source address Badd40 and the backend network destination address Badd42 of the first network packet 410 are directly transformed by the direct mode communication network address processing unit 4133 into a direct mode communication network source address Dadd40 and a direct mode communication network destination address Dadd44 respectively.

After the network addresses of the first network packet 410 have been transformed by the direct mode communication network address processing unit 4133, the direct mode communication network TFT processing unit 4137 transmits the first network packet 410 to the receiving direct mode communication apparatus 43 through the transceiver 411 and via the direct communication connection 42 according to one of the direct mode communication network source address Dadd40, the direct mode communication network destination address Dadd42 and a combination thereof (i.e., according to the direct mode communication network source address Dadd40 or the direct mode communication network destination address Dadd42 separately or according to a combination of the both).

On the other hand, the direct mode communication network address processing unit 4331 of the receiving direct mode communication apparatus 43 receives the first network packet 410 from the transmitting direct mode communication apparatus 41 through the transceiver 431 and via the direct mode communication connection 42, and transforms the direct mode communication network source address Dadd40 and the direct mode communication network destination address Dadd42 of the first network packet 410 into the backend network source address Badd40 and the backend network destination address Badd42 respectively.

After the network addresses of the first network packet 410 have been processed by the direct mode communication network address processing unit 4331, the backend network address processing unit 4333 analyzes the first network packet 410 according to one of the backend network source address Badd40, the backend network destination address Badd42 and a combination thereof (i.e., according to the backend network source address Badd40 or the backend network destination address Badd42 separately or according to a combination of the both) and forwards the first network packet 410 to the TCP/UDP layer for subsequent processing.

Then when the packet processing module 413 of the transmitting direct mode communication apparatus 41 detects and determines that the direct communication connection 42 is interrupted and the transmitting direct mode communication apparatus 41 is to transmit a second network packet 412 to the receiving direct mode communication apparatus 43, the backend network address processing unit 4131 of the transmitting direct mode communication apparatus 41 transmits the second network packet 412 to the backend network TFT processing unit 4135. Similarly, the second network packet 412 comprises the backend network source address Badd40 and the backend network destination address Badd42.

Because the direct communication connection 42 has been interrupted, the backend network TFT processing unit 4135 of the transmitting direct mode communication apparatus 41 transmits the second network packet 412 to the receiving direct mode communication apparatus 43 through the transceiver 411 and via the backend network connection 40 according to one of the backend network source address Badd40, the backend network destination address Badd42 and a combination thereof (i.e., according to the backend network source address Badd40 or the backend network destination address Badd42 separately or according to a combination of the both).

Similarly, after the direct communication connection 42 is interrupted, the backend network address processing unit 4333 of the receiving direct mode communication apparatus 43 receives the second network packet 412 from the transmitting direct mode communication apparatus 41 through the transceiver 431 and via the backend network connection 40, and analyzes the second network packet 412 according to one of the backend network source address Badd40, the backend network destination address Badd42 and a combination thereof (i.e., according to the backend network source address Badd40 or the backend network destination address Badd42 separately or according to a combination of the both) directly. Then, the second network packet 412 is forwarded to the TCP/UDP layer for subsequent processing.

Figure 5A:
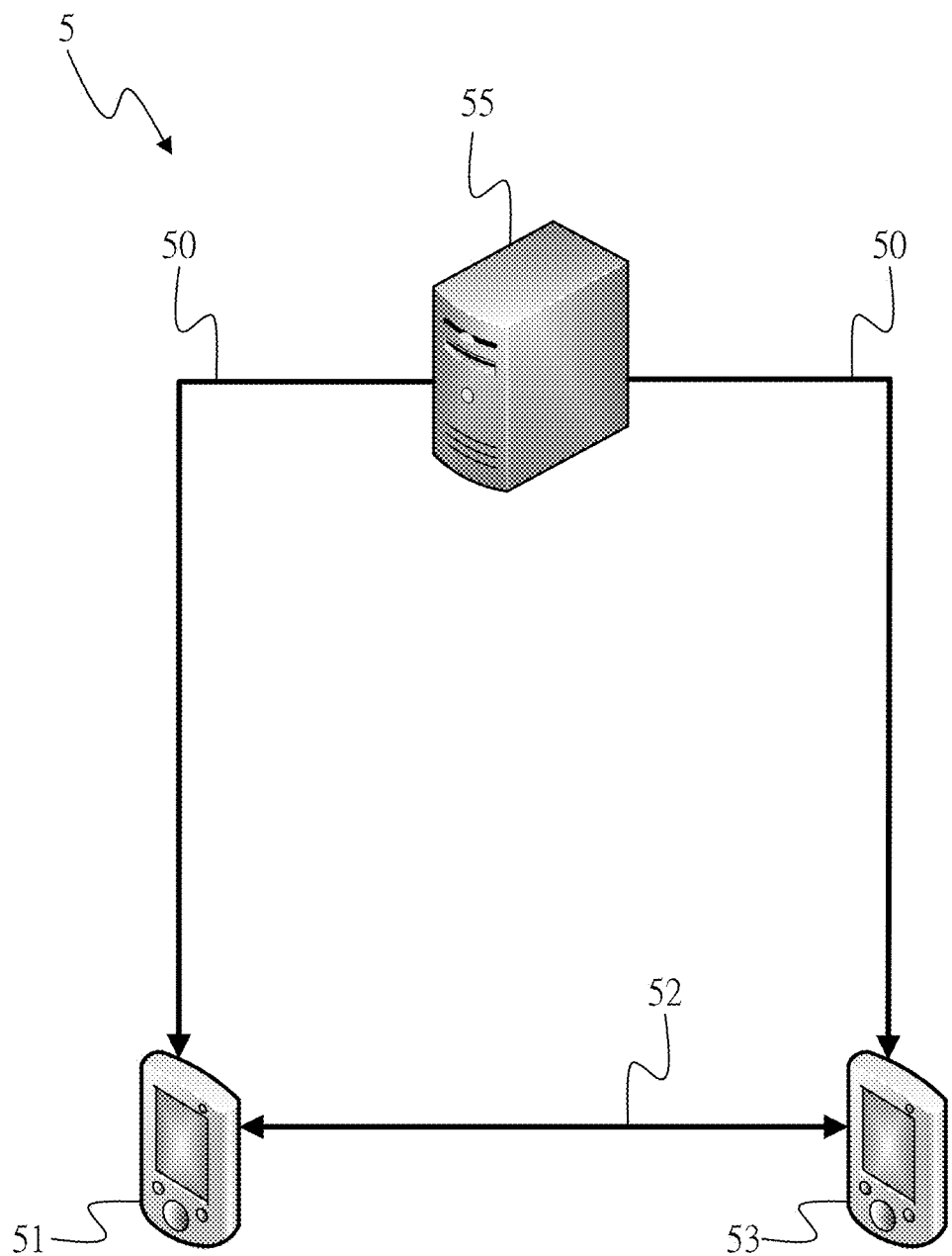
FIG. 5A is a schematic view of a direct mode communication system according to a fifth embodiment of the present invention.
Figure 5B:
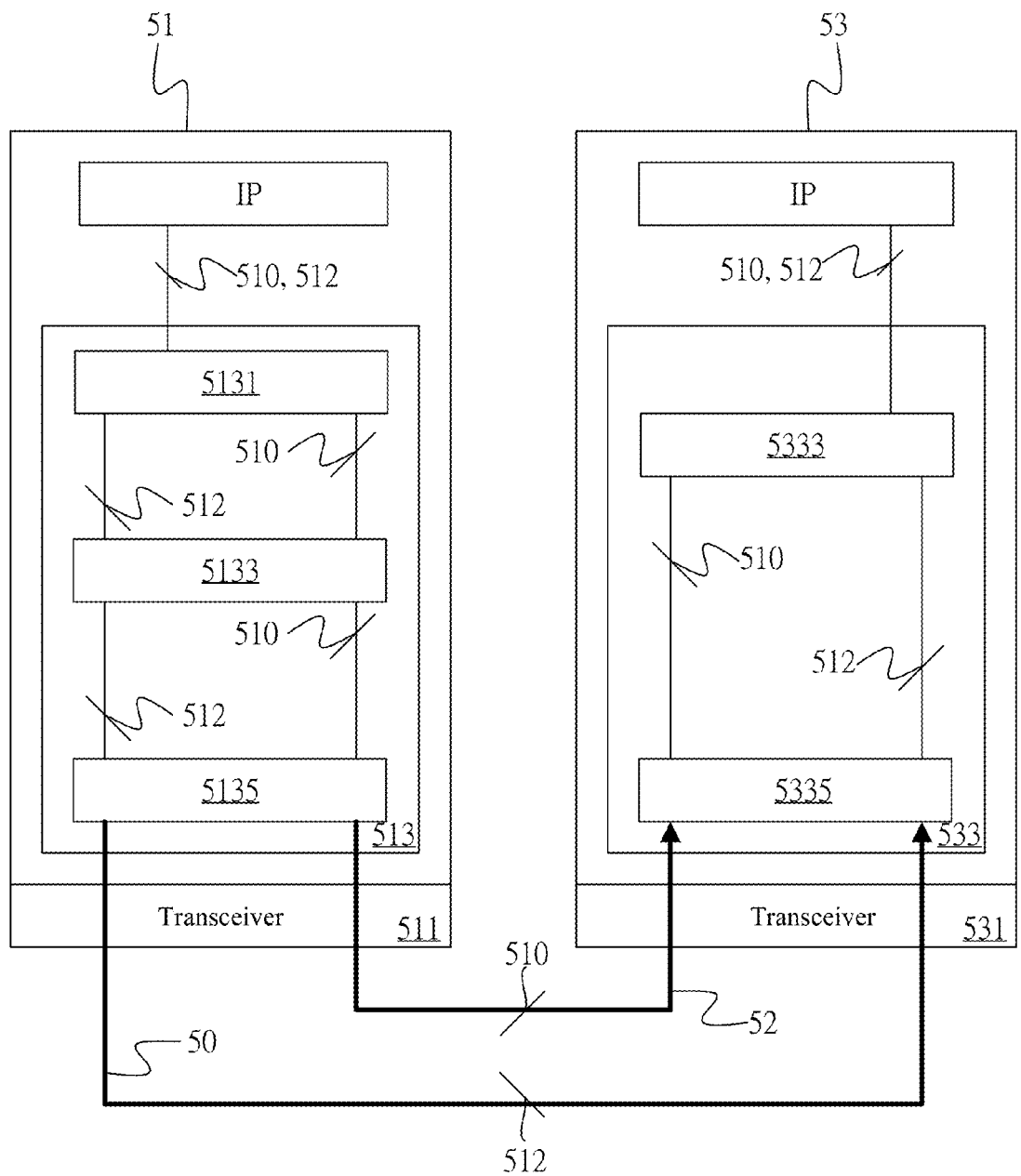
FIG. 5B is a block diagram of a transmitting direct mode communication apparatus and a receiving direct mode communication apparatus according to the fifth embodiment of the present invention.

Refer to FIG. 5A and FIG. 5B together. FIG. 5A is a schematic view of a direct mode communication system 5 according to a fifth embodiment of the present invention. The direct mode communication system 5 comprises a transmitting direct mode communication apparatus 51, a receiving direct mode communication apparatus 53 and a backend network server 55. The transmitting direct mode communication apparatus 51 maintains a backend network connection 50 with the receiving direct mode communication apparatus 53 via the backend network server 55.

FIG. 5B is a block diagram of the transmitting direct mode communication apparatus 51 and the receiving direct mode communication apparatus 53 according to the fifth embodiment of the present invention. The transmitting direct mode communication apparatus 51 comprises a transceiver 511 and a packet processing module 513. The packet processing module 513 further comprises a TFT processing unit 5131, a dual-mode Packet Data Convergence Protocol (PDCP) processing unit 5133 and a dual-mode Radio Link Control (RLC) processing unit 5135.

On the other hand, the receiving direct mode communication apparatus 53 comprises a transceiver 531 and a packet processing module 533. The packet processing module 533 further comprises a dual-mode PDCP processing unit 5333 and a dual-mode RLC processing unit 5335. The fifth embodiment mainly details the packet transmission and switching processes for a connection of a different form. Interactions among the individual elements will be further described hereinbelow.

Firstly, the packet processing module 513 of the transmitting direct mode communication apparatus 51 creates a direct communication connection 52 with the receiving direct mode communication apparatus 53 via the transceiver 511. In other words, the packet processing module 533 of the receiving direct mode communication apparatus 53 creates the direct communication connection 52 with the transmitting direct mode communication apparatus 51 via the transceiver 531.

Then, before a first network packet 510 is transmitted by the transmitting direct mode communication apparatus 51 to the receiving direct mode communication apparatus 53, the TFT processing unit 5131 of the transmitting direct mode communication apparatus 51 receives the first network packet 510 from the IP layer and transmits internally the first network packet 510 to the dual-mode PDCP processing unit 5133.

Next, the dual-mode PDCP processing unit 5133 transmits the first network packet 510 to the dual-mode RLC processing unit 5135 in a PDCP direct communication mode (not shown). The dual-mode RLC processing unit 5335 further transmits the first network packet 510 to the receiving direct mode communication apparatus 53 through the transceiver 511 and via the direct communication connection 52 in an RLC direct communication mode.

On the other hand, the dual-mode RLC processing unit 5335 of the receiving direct mode communication apparatus 53 receives the first network packet 510 from the transmitting direct mode communication apparatus 51 through the transceiver 531 and via the direct communication connection 52 in an RLC direct communication mode (not shown), and forwards the first network packet 510 to the dual-mode PDCP processing unit 5333. Then, the dual-mode PDCP processing unit 5333 further analyzes the first network packet 510 in a PDCP direct communication mode (not shown), and forwards the first network packet 510 to the IP layer for subsequent processing.

Subsequently, when the packet processing module 513 of the transmitting direct mode communication apparatus 51 detects and determines that the direct communication connection 52 is interrupted and the transmitting direct mode communication apparatus 51 is to transmit a second network packet 512 to the receiving direct mode communication apparatus 53, the TFT processing unit 5131 of the transmitting direct mode communication apparatus 51 receives the second network packet 512 from the IP layer and transmits internally the second network packet 512 to the dual-mode PDCP processing unit 5133.

Afterwards, the dual-mode PDCP processing unit 5133 transmits the second network packet 512 to the dual-mode RLC processing unit 5135 in a PDCP backend network mode (not shown). The dual-mode RLC processing unit 5135 further transmits the second network packet 512 to the receiving direct mode communication apparatus 53 through the transceiver 511 and via the backend network connection 50 in an RLC backend network mode (not shown).

On the other hand, after the direct communication connection 52 is interrupted, the dual-mode RLC processing unit 5335 of the receiving direct mode communication apparatus 53 receives the second network packet 512 from the transmitting direct mode communication apparatus 51 through the transceiver 531 and via the backend network connection 50 in an RLC backend network mode (not shown). Then, the dual-mode PDCP processing unit 5333 analyzes the second network packet 512 in a PDCP backend network mode (not shown) and further forwards the second network packet 512 to the IP layer for subsequent processing.

Figure 6:
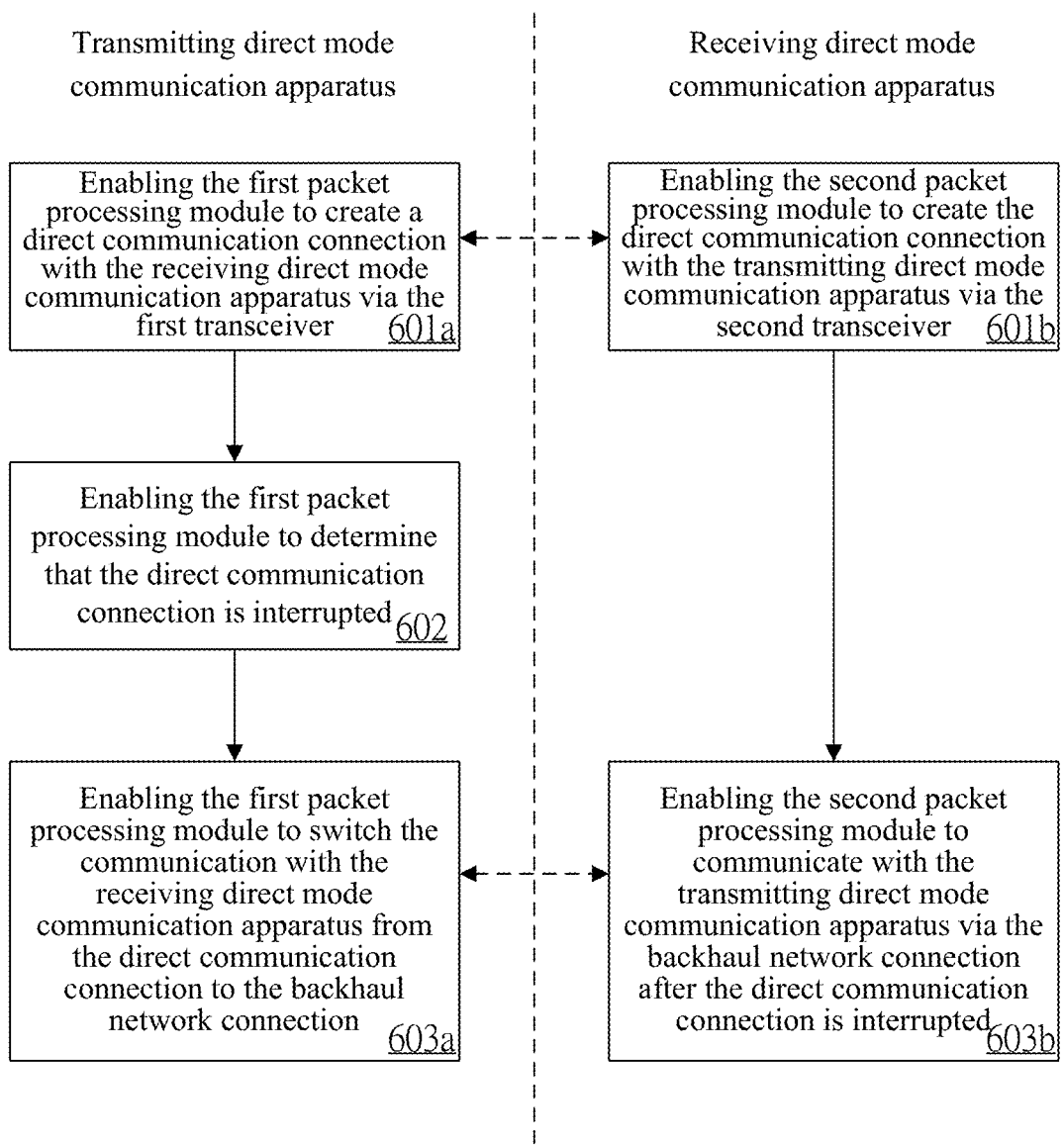
FIG. 6 is a flowchart diagram of a communication path switching method according to a sixth embodiment of the present invention.

A sixth embodiment of the present invention is a communication path switching method, a flowchart diagram of which is shown in FIG. 6. The method of the sixth embodiment is for use in a transmitting direct mode communication apparatus and a receiving direct mode communication apparatus (e.g., the transmitting direct mode communication apparatus 11 and the receiving direct mode communication apparatus 13 of the aforesaid embodiment).

The transmitting direct mode communication apparatus comprises a first packet processing module and a first transceiver; and the receiving direct mode communication apparatus comprises a second packet processing module and a second transceiver. The transmitting direct mode communication apparatus maintains a backend network connection with the receiving direct mode communication apparatus via a backend network server. Steps of the sixth embodiment are detailed as follows.

Firstly, step 601a is executed to enable the first packet processing module to create a direct communication connection with the receiving direct mode communication apparatus via the first transceiver. Simultaneously, step 601b is executed to enable the second packet processing module to create the direct communication connection with the transmitting direct mode communication apparatus via the second transceiver. Then, step 602 is executed to enable the first packet processing module to determine that the direct communication connection is interrupted.

Next, step 603a is executed to enable the first packet processing module to switch the communication with the receiving direct mode communication apparatus from the direct communication connection to the backend network connection. Simultaneously, step 603b is executed to enable the second packet processing module to communicate with the transmitting direct mode communication apparatus via the backend network connection after the direct communication connection is interrupted.

Figure 7A:
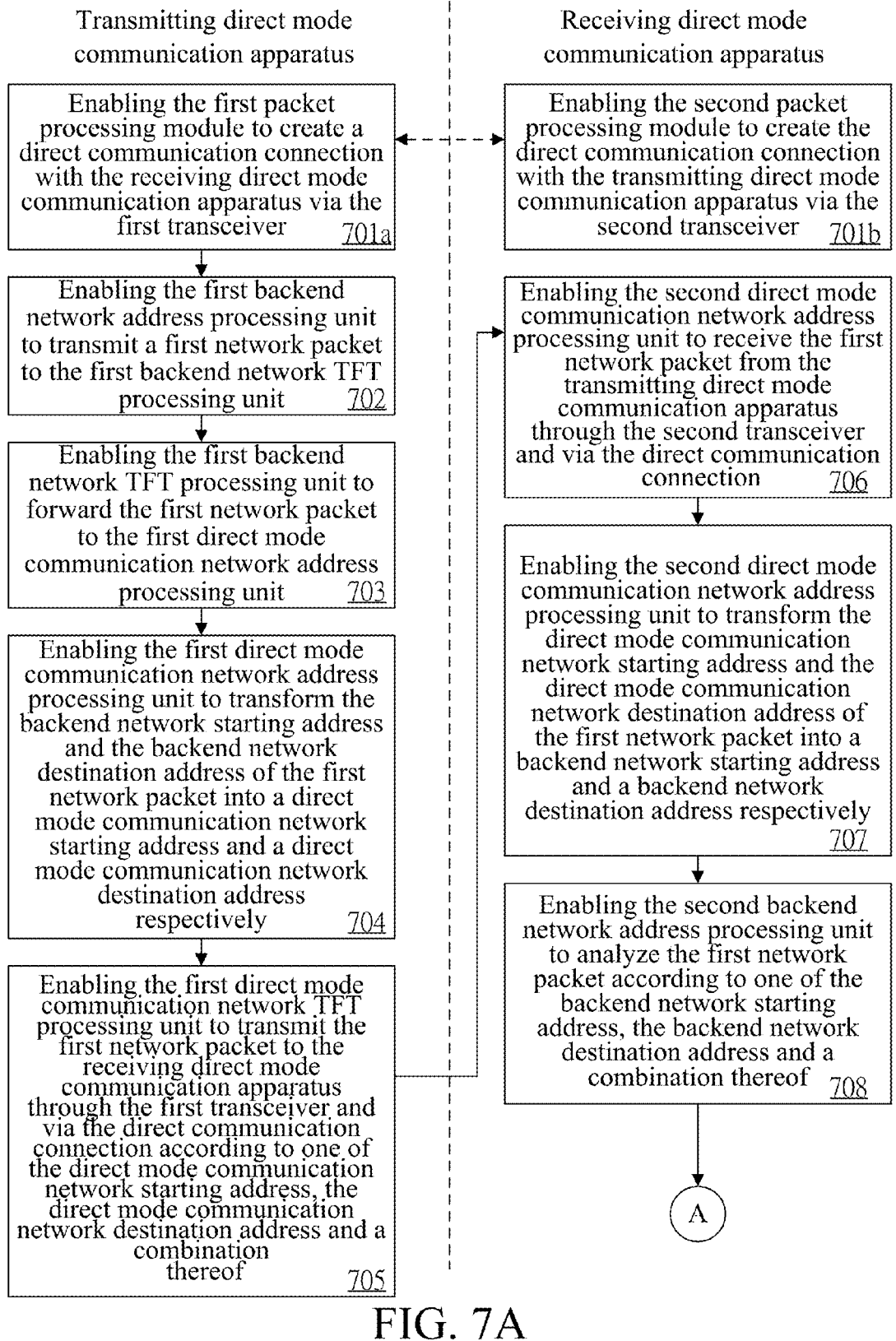
FIGS. 7A-7B illustrate a flowchart diagram of a communication path switching method according to a seventh embodiment of the present invention.
Figure 7B:
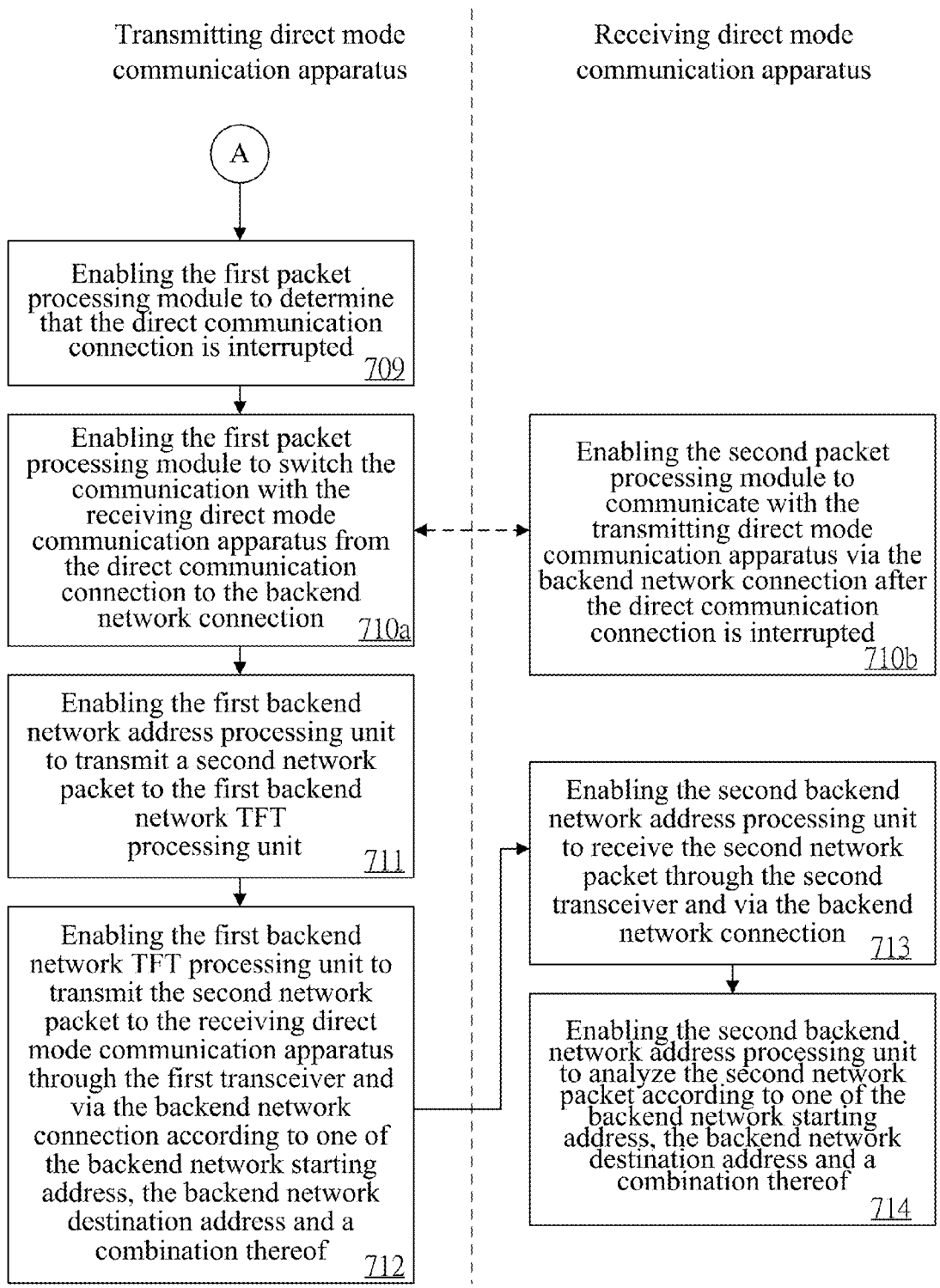

A seventh embodiment of the present invention is a communication path switching method, a flowchart diagram of which is shown in FIGS. 7A-7B. The method of the seventh embodiment is for use in a transmitting direct mode communication apparatus and a receiving direct mode communication apparatus (e.g., the transmitting direct mode communication apparatus 21 and the receiving direct mode communication apparatus 23 of the aforesaid embodiment).

The transmitting direct mode communication apparatus comprises a first packet processing module and a first transceiver; and the receiving direct mode communication apparatus comprises a second packet processing module and a second transceiver. The transmitting direct mode communication apparatus maintains a backend network connection with the receiving direct mode communication apparatus via a backend network server.

The first packet processing module further comprises a first backend network address processing unit, a first direct mode communication network address processing unit, a first backend network traffic filter template (TFT) processing unit and a first direct mode communication network TFT processing unit. The second packet processing module further comprises a second backend network address processing unit and a second direct mode communication network address processing unit. Steps of the seventh embodiment are detailed as follows.

Firstly, step 701a is executed to enable the first packet processing module to create a direct communication connection with the receiving direct mode communication apparatus via the first transceiver. Simultaneously, step 701b is executed to enable the second packet processing module to create the direct communication connection with the transmitting direct mode communication apparatus via the second transceiver.

Then, step 702 is executed to enable the first backend network address processing unit to transmit a first network packet to the first backend network TFT processing unit. The first network packet comprises a backend network source address and a backend network destination address. Step 703 is executed to enable the first backend network TFT processing unit to forward the first network packet to the first direct mode communication network address processing unit.

Step 704 is executed to enable the first direct mode communication network address processing unit to transform the backend network source address and the backend network destination address of the first network packet into a direct mode communication network source address and a direct mode communication network destination address respectively. Step 705 is executed to enable the first direct mode communication network TFT processing unit to transmit the first network packet to the receiving direct mode communication apparatus through the first transceiver and via the direct communication connection according to one of the direct mode communication network source address, the direct mode communication network destination address and a combination thereof.

Then, step 706 is executed to enable the second direct mode communication network address processing unit to receive the first network packet from the transmitting direct mode communication apparatus through the second transceiver and via the direct communication connection. Step 707 is executed to enable the second direct mode communication network address processing unit to transform the direct mode communication network source address and the direct mode communication network destination address of the first network packet into a backend network source address and a backend network destination address respectively. Step 708 is executed to enable the second backend network address processing unit to analyze the first network packet according to one of the backend network source address, the backend network destination address and a combination thereof.

Step 709 is executed to enable the first packet processing module to determine that the direct communication connection is interrupted. Step 710a is executed to enable the first packet processing module to switch the communication with the receiving direct mode communication apparatus from the direct communication connection to the backend network connection. Simultaneously, step 710b is executed to enable the second packet processing module to communicate with the transmitting direct mode communication apparatus via the backend network connection after the direct communication connection is interrupted.

Step 711 is executed to enable the first backend network address processing unit to transmit a second network packet to the first backend network TFT processing unit. The second network packet comprises the backend network source address and the backend network destination address. Step 712 is executed to enable the first backend network TFT processing unit to transmit the second network packet to the receiving direct mode communication apparatus through the first transceiver and via the backend network connection according to one of the backend network source address, the backend network destination address and a combination thereof.

Step 713 is executed to enable the second backend network address processing unit to receive the second network packet through the second transceiver and via the backend network connection. Step 714 is executed to enable the second backend network address processing unit to analyze the second network packet according to one of the backend network source address, the backend network destination address and a combination thereof.

Figure 8A:
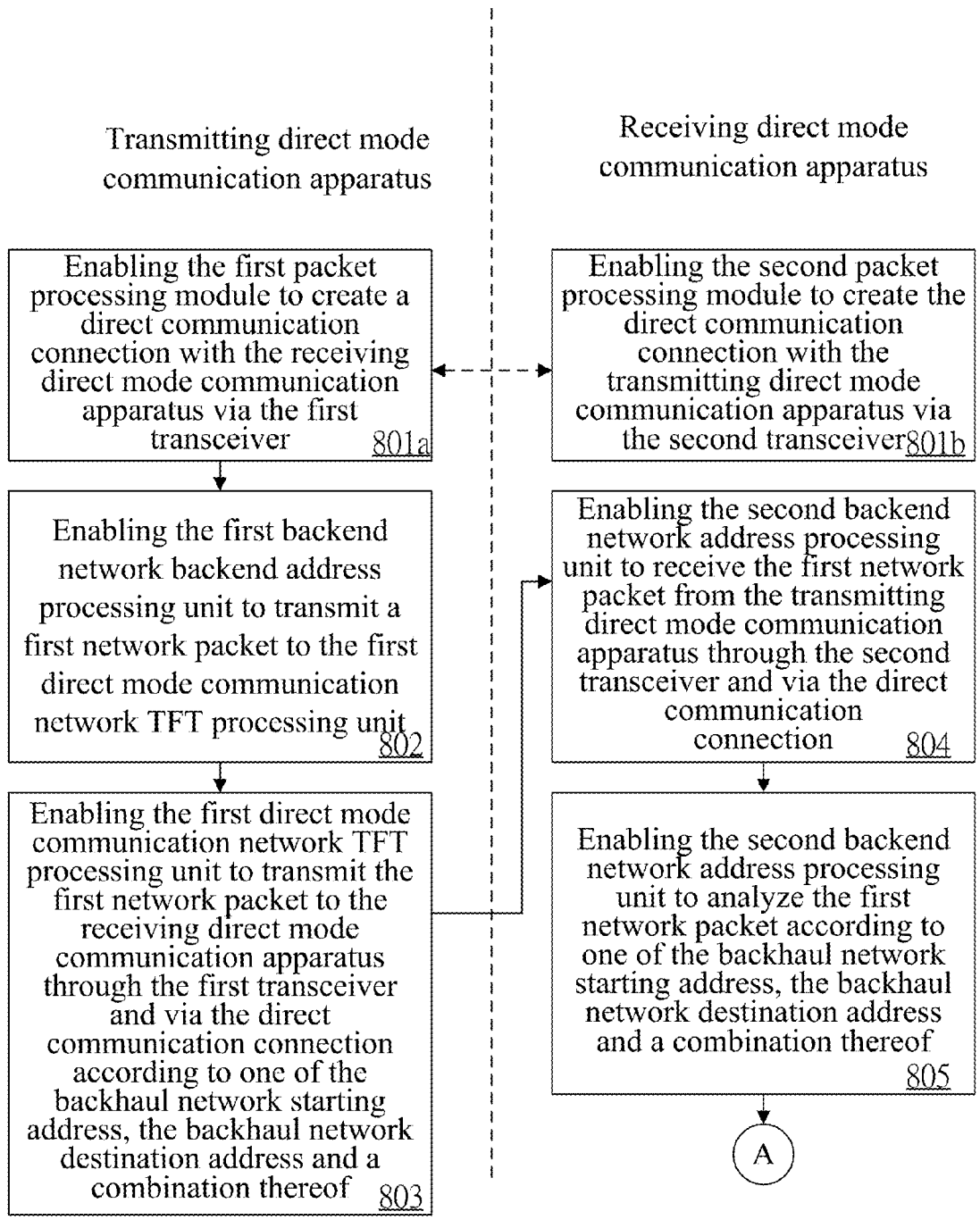
FIGS. 8A-8B illustrate a flowchart diagram of a communication path switching method according to an eighth embodiment of the present invention.
Figure 8B:
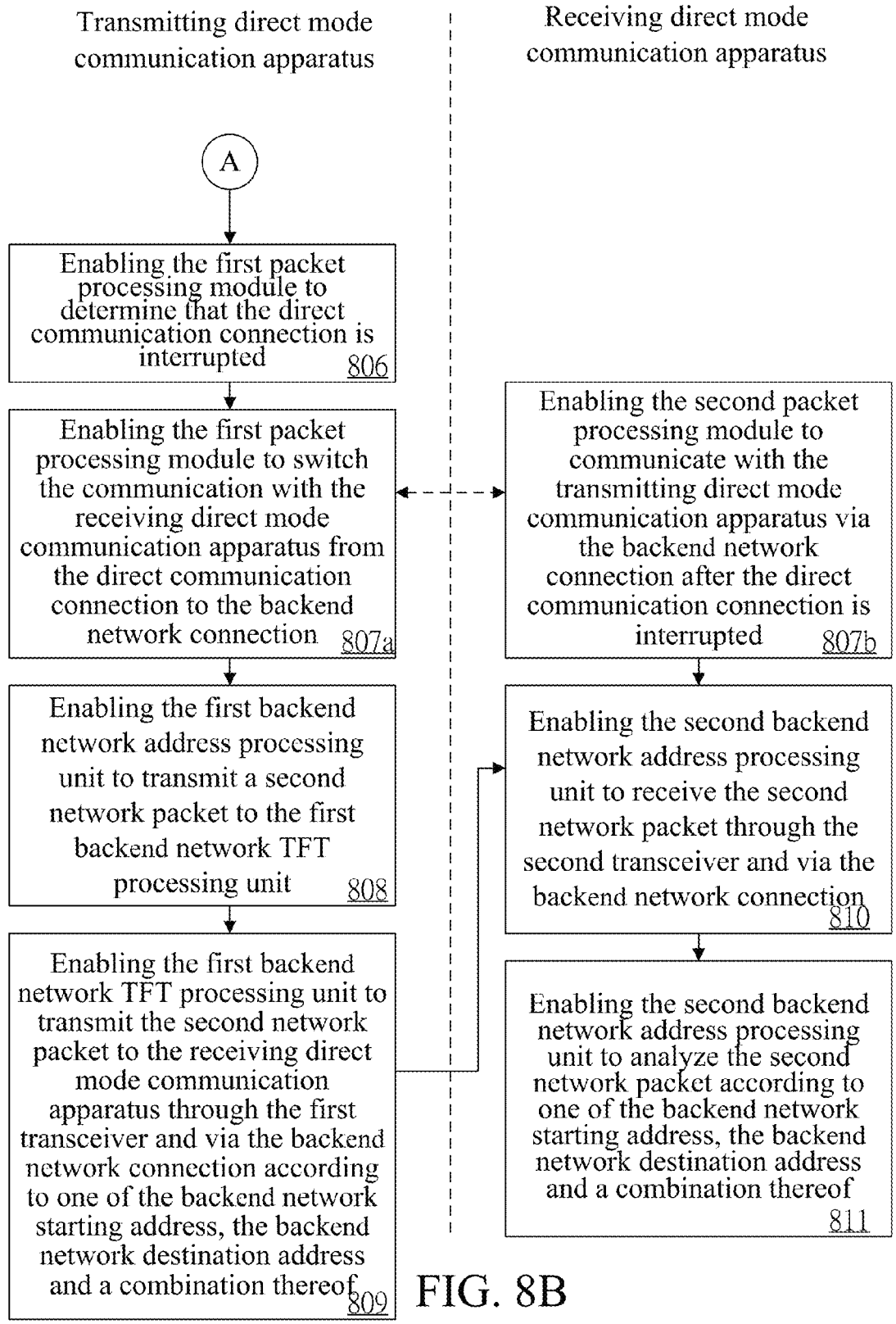

An eighth embodiment of the present invention is a communication path switching method, a flowchart diagram of which is shown in FIG. 8. The method of the eighth embodiment is for use in a transmitting direct mode communication apparatus and a receiving direct mode communication apparatus (e.g., the transmitting direct mode communication apparatus 31 and the receiving direct mode communication apparatus 33 of the aforesaid embodiment).

The transmitting direct mode communication apparatus comprises a first packet processing module and a first transceiver; and the receiving direct mode communication apparatus comprises a second packet processing module and a second transceiver. The transmitting direct mode communication apparatus maintains a backend network connection with the receiving direct mode communication apparatus via a backend network server.

The first packet processing module further comprises a first backend network address processing unit, a first backend network TFT processing unit and a first direct mode communication network TFT processing unit. The second packet processing module further comprises a second backend network address processing unit. Steps of the eighth embodiment are detailed as follows.

Firstly, step 801a is executed to enable the first packet processing module to create a direct communication connection with the receiving direct mode communication apparatus via the first transceiver. Simultaneously, step 801b is executed to enable the second packet processing module to create the direct communication connection with the transmitting direct mode communication apparatus via the second transceiver.

Then, step 802 is executed to enable the first backend network address processing unit to transmit a first network packet to the first direct mode communication network TFT processing unit. The first network packet comprises a backend network source address and a backend network destination address. Step 803 is executed to enable the first direct mode communication network TFT processing unit to transmit the first network packet to the receiving direct mode communication apparatus through the first transceiver and via the direct communication connection according to one of the backend network source address, the backend network destination address and a combination thereof.

Then, step 804 is executed to enable the second backend network address processing unit to receive the first network packet from the transmitting direct mode communication apparatus through the second transceiver and via the direct communication connection. Step 805 is executed to enable the second backend network address processing unit to analyze the first network packet according to one of the backend network source address, the backend network destination address and a combination thereof.

Step 806 is executed to enable the first packet processing module to determine that the direct communication connection is interrupted. Step 807a is executed to enable the first packet processing module to switch the communication with the receiving direct mode communication apparatus from the direct communication connection to the backend network connection. Simultaneously, step 807b is executed to enable the second packet processing module to communicate with the transmitting direct mode communication apparatus via the backend network connection after the direct communication connection is interrupted.

Step 808 is executed to enable the first backend network address processing unit to transmit a second network packet to the first backend network TFT processing unit. The second network packet comprises the backend network source address and the backend network destination address. Step 809 is executed to enable the first backend network TFT processing unit to transmit the second network packet to the receiving direct mode communication apparatus through the first transceiver and via the backend network connection according to one of the backend network source address, the backend network destination address and a combination thereof.

Step 810 is executed to enable the second backend network address processing unit to receive the second network packet through the second transceiver and via the backend network connection. Step 811 is executed to enable the second backend network address processing unit to analyze the second network packet according to one of the backend network source address, the backend network destination address and a combination thereof.

Figure 9A:
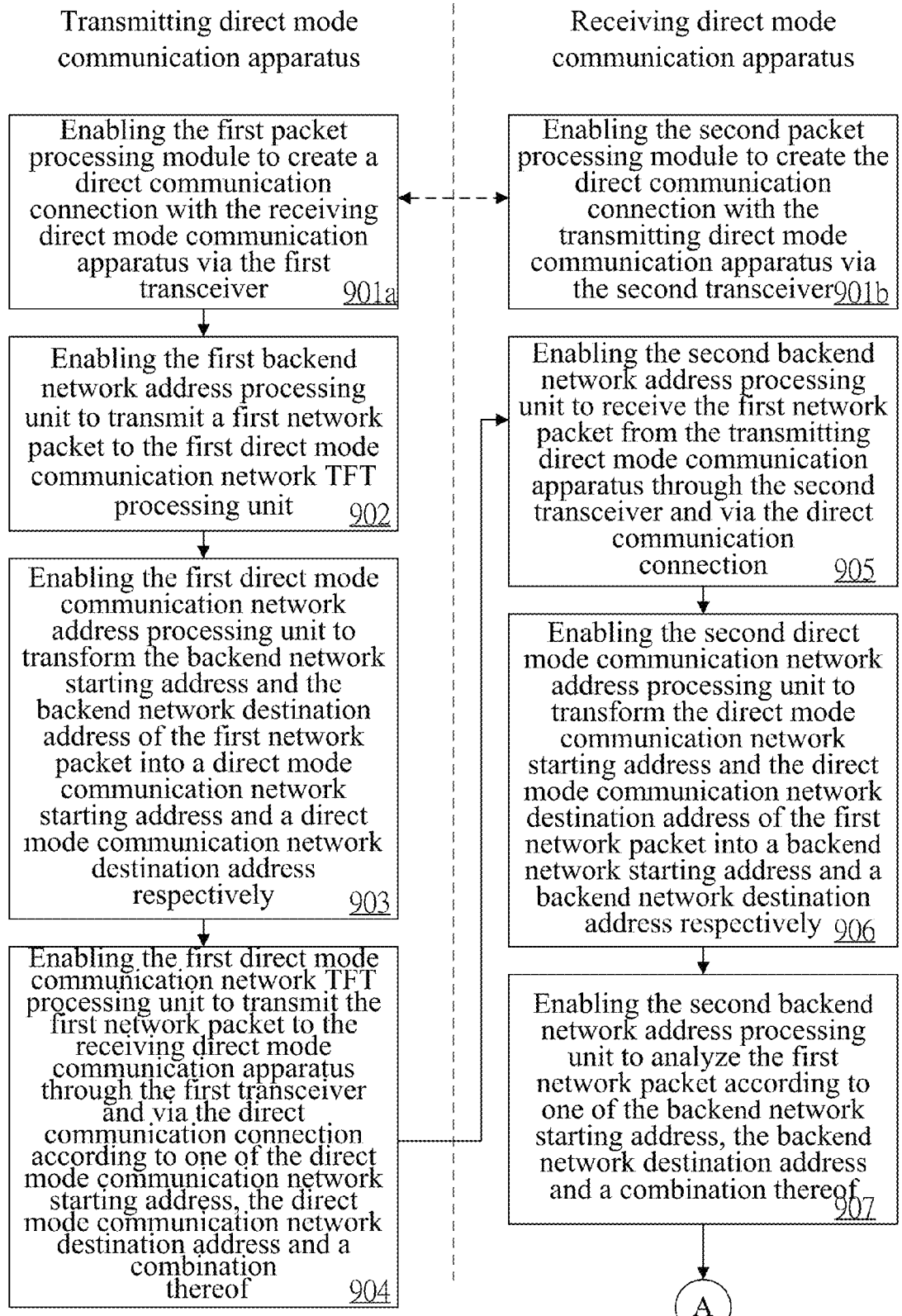
FIGS. 9A-9B illustrate a flowchart diagram of a communication path switching method according to a ninth embodiment of the present invention.
Figure 9B:
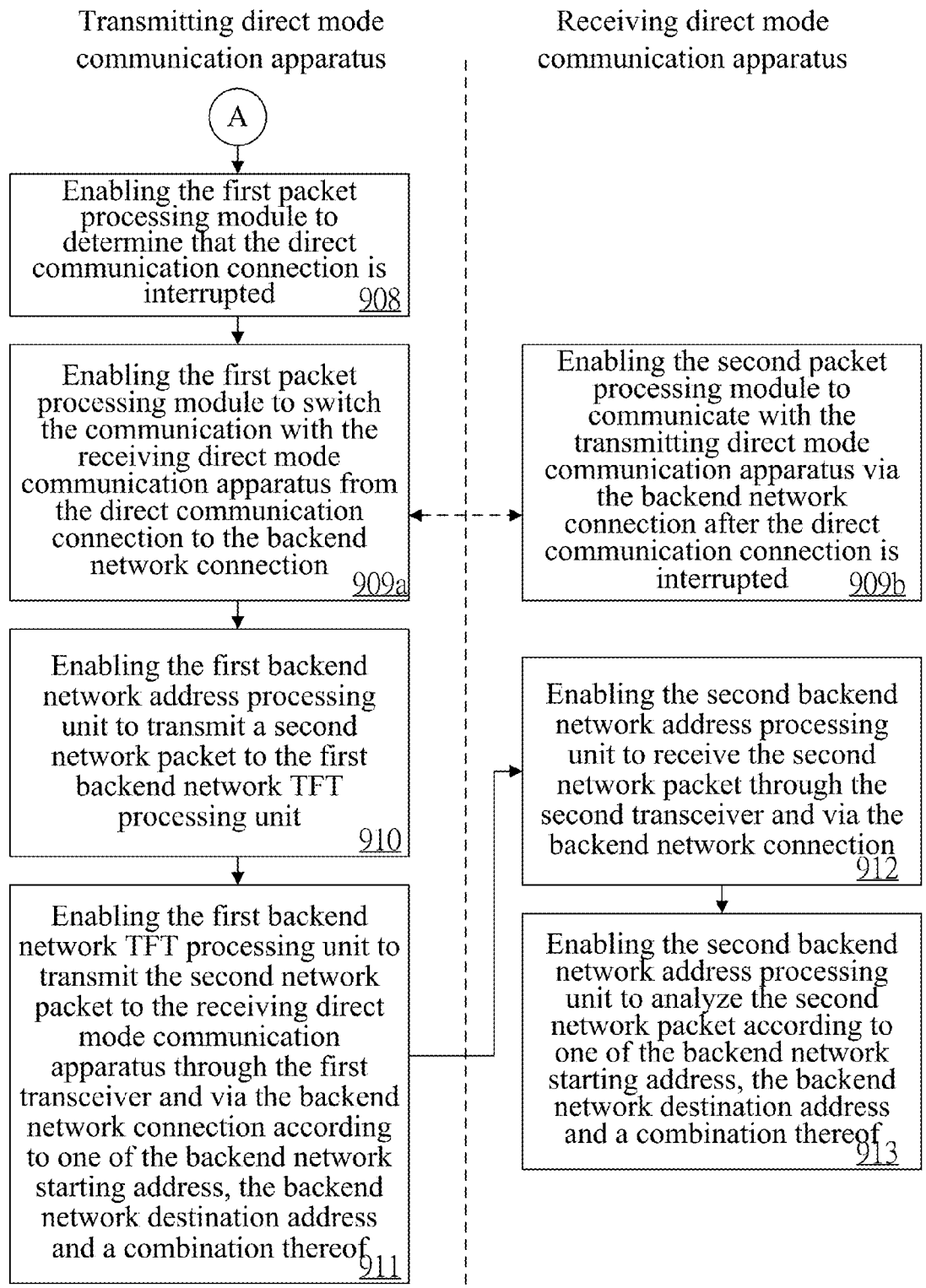

A ninth embodiment of the present invention is a communication path switching method, a flowchart diagram of which is shown in FIGS. 9A-9B. The method of the ninth embodiment is for use in a transmitting direct mode communication apparatus and a receiving direct mode communication apparatus (e.g., the transmitting direct mode communication apparatus 41 and the receiving direct mode communication apparatus 43 of the aforesaid embodiment).

The transmitting direct mode communication apparatus comprises a first packet processing module and a first transceiver; and the receiving direct mode communication apparatus comprises a second packet processing module and a second transceiver. The transmitting direct mode communication apparatus maintains a backend network connection with the receiving direct mode communication apparatus via a backend network server.

The first packet processing module further comprises a first backend network address processing unit, a first direct mode communication network address processing unit, a first backend network TFT processing unit and a first direct mode communication network TFT processing unit. The second packet processing module further comprises a second backend network address processing unit and a second direct mode communication network address processing unit. Steps of the ninth embodiment are detailed as follows.

Firstly, step 901a is executed to enable the first packet processing module to create a direct communication connection with the receiving direct mode communication apparatus via the first transceiver. Simultaneously, step 901b is executed to enable the second packet processing module to create the direct communication connection with the transmitting direct mode communication apparatus via the second transceiver.

Then, step 902 is executed to enable the first backend network address processing unit to transmit a first network packet to the first direct mode communication network TFT processing unit. The first network packet comprises a backend network source address and a backend network destination address. Step 903 is executed to enable the first direct mode communication network address processing unit to transform the backend network source address and the backend network destination address of the first network packet into a direct mode communication network source address and a direct mode communication network destination address respectively.

Step 904 is executed to enable the first direct mode communication network TFT processing unit to transmit the first network packet to the receiving direct mode communication apparatus through the first transceiver and via the direct communication connection according to one of the direct mode communication network source address, the direct mode communication network destination address and a combination thereof. Step 905 is executed to enable the second backend network address processing unit to receive the first network packet from the transmitting direct mode communication apparatus through the second transceiver and via the direct communication connection.

Step 906 is executed to enable the second direct mode communication network address processing unit to transform the direct mode communication network source address and the direct mode communication network destination address of the first network packet into a backend network source address and a backend network destination address respectively. Step 907 is executed to enable the second backend network address processing unit to analyze the first network packet according to one of the backend network source address, the backend network destination address and a combination thereof.

Step 908 is executed to enable the first packet processing module to determine that the direct communication connection is interrupted. Step 909a is executed to enable the first packet processing module to switch the communication with the receiving direct mode communication apparatus from the direct communication connection to the backend network connection. Simultaneously, step 909b is executed at the same time to enable the second packet processing module to communicate with the transmitting direct mode communication apparatus via the backend network connection after the direct communication connection is interrupted.

Step 910 is executed to enable the first backend network address processing unit to transmit a second network packet to the first backend network TFT processing unit. The second network packet comprises the backend network source address and the backend network destination address. Step 911 is executed to enable the first backend network TFT processing unit to transmit the second network packet to the receiving direct mode communication apparatus through the first transceiver and via the backend network connection according to one of the backend network source address, the backend network destination address and a combination thereof.

Step 912 is executed to enable the second backend network address processing unit to receive the second network packet through the second transceiver and via the backend network connection. Step 913 is executed to enable the second backend network address processing unit to analyze the second network packet according to one of the backend network source address, the backend network destination address and a combination thereof.

Figure 10A:
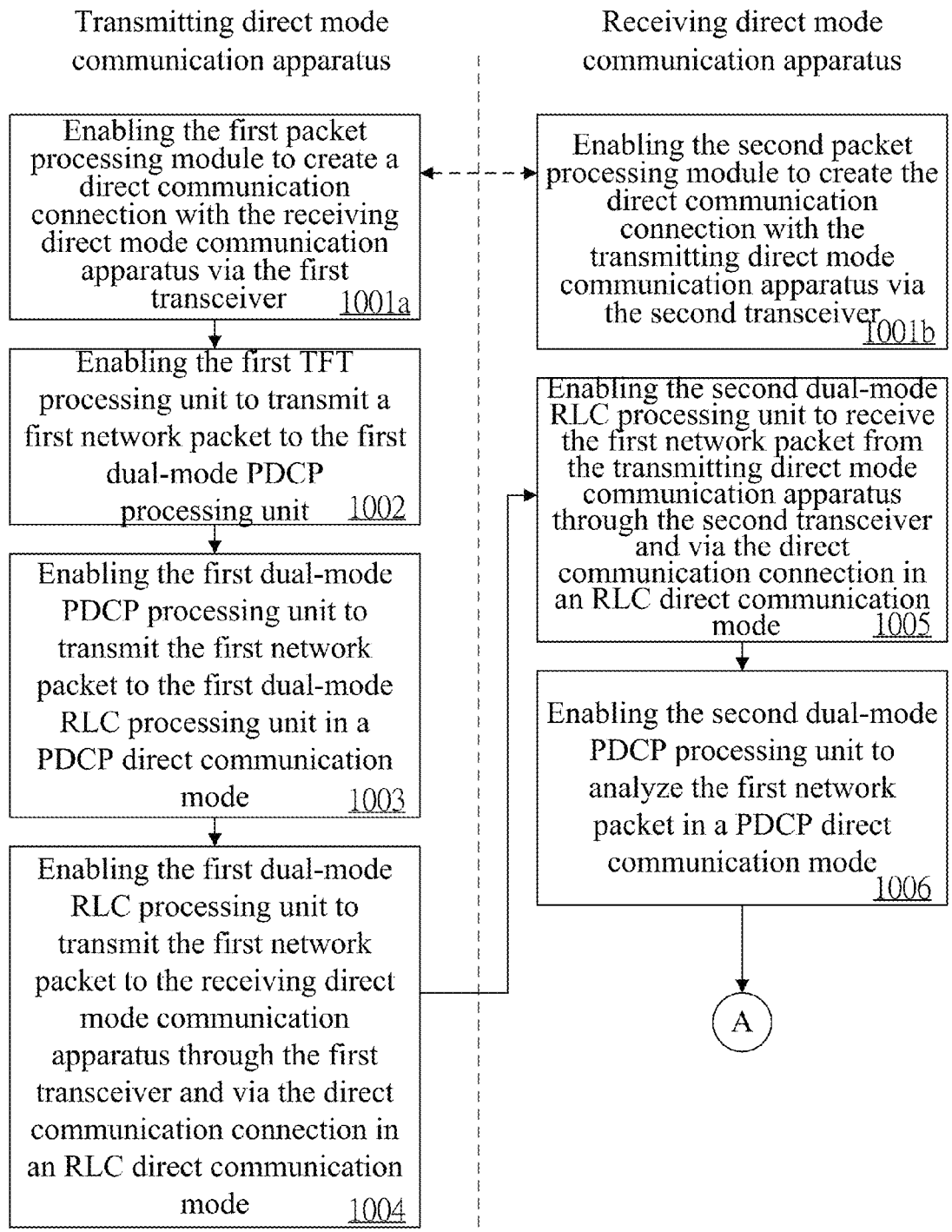
FIGS. 10A-10B illustrate a flowchart diagram of a communication path switching method according to a tenth embodiment of the present invention.
Figure 10B:
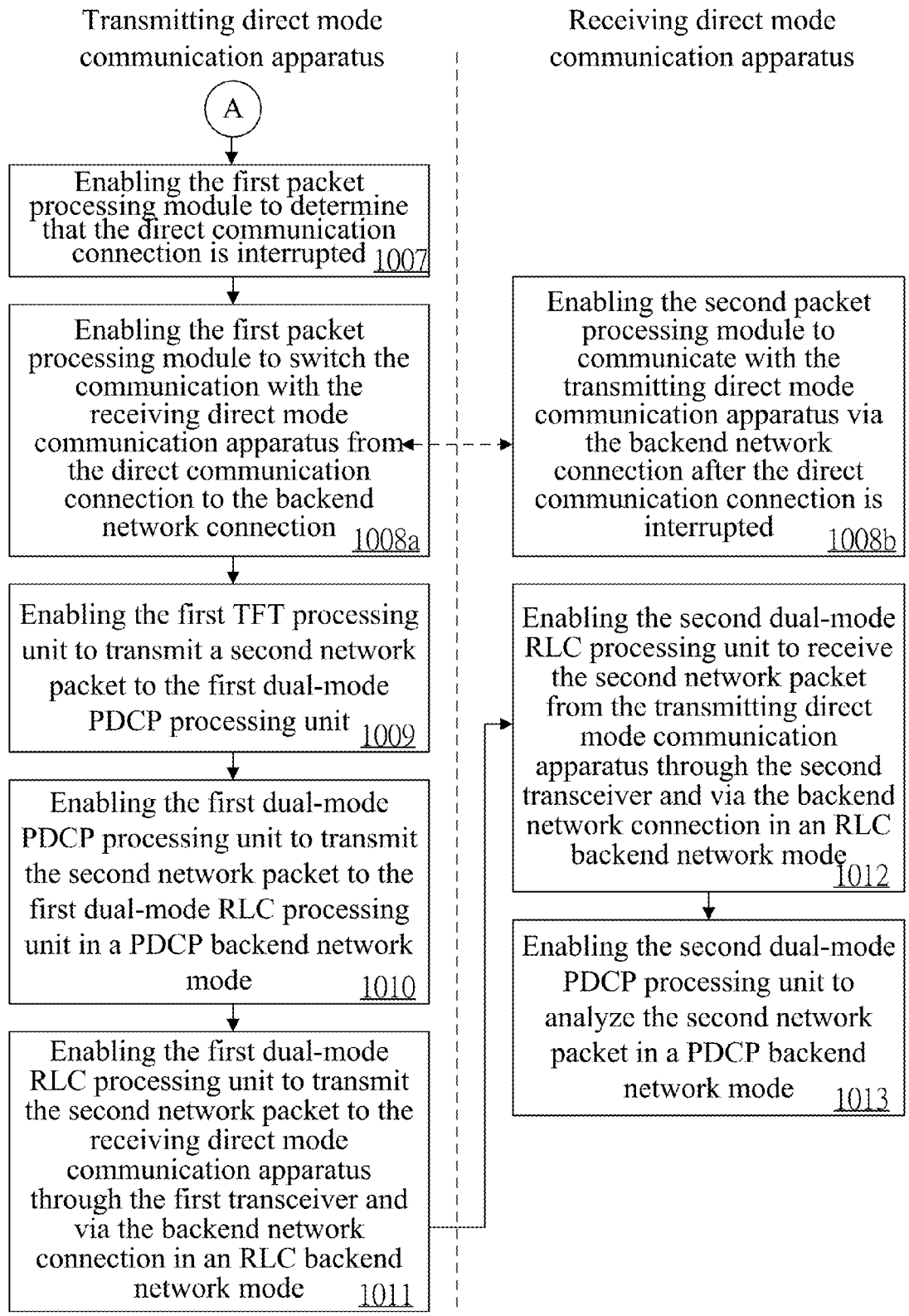

A tenth embodiment of the present invention is a communication path switching method, a flowchart diagram of which is shown in FIGS. 10A-10B. The method of the tenth embodiment is for use in a transmitting direct mode communication apparatus and a receiving direct mode communication apparatus (e.g., the transmitting direct mode communication apparatus 51 and the receiving direct mode communication apparatus 53 of the aforesaid embodiment).

The transmitting direct mode communication apparatus comprises a first packet processing module and a first transceiver; and the receiving direct mode communication apparatus comprises a second packet processing module and a second transceiver. The transmitting direct mode communication apparatus maintains a backend network connection with the receiving direct mode communication apparatus via a backend network server.

The first packet processing module further comprises a first TFT processing unit, a first dual-mode PDCP processing unit and a first dual-mode RLC processing unit. The second packet processing module further comprises a second dual-mode PDCP processing unit and a second dual-mode RLC processing unit. Steps of the tenth embodiment are detailed as follows.

Firstly, step 1001a is executed to enable the first packet processing module to create a direct communication connection with the receiving direct mode communication apparatus via the first transceiver. Simultaneously, step 1001b is executed to enable the second packet processing module to create the direct communication connection with the transmitting direct mode communication apparatus via the second transceiver.

Then, step 1002 is executed to enable the first TFT processing unit to transmit a first network packet to the first dual-mode PDCP processing unit. Step 1003 is executed to enable the first dual-mode PDCP processing unit to transmit the first network packet to the first dual-mode RLC processing unit in a PDCP direct communication mode. Step 1004 is executed to enable the first dual-mode RLC processing unit to transmit the first network packet to the receiving direct mode communication apparatus through the first transceiver and via the direct communication connection in an RLC direct communication mode.

Step 1005 is executed to enable the second dual-mode RLC processing unit to receive the first network packet from the transmitting direct mode communication apparatus through the second transceiver and via the direct communication connection in an RLC direct communication mode. Step 1006 is executed to enable the second dual-mode PDCP processing unit to analyze the first network packet in a PDCP direct communication mode.

Step 1007 is executed to enable the first packet processing module to determine that the direct communication connection is interrupted. Step 1008a is executed to enable the first packet processing module to switch the communication with the receiving direct mode communication apparatus from the direct communication connection to the backend network connection. Simultaneously, step 1008b is executed to enable the second packet processing module to communicate with the transmitting direct mode communication apparatus via the backend network connection after the direct communication connection is interrupted.

Next, step 1009 is executed to enable the first TFT processing unit to transmit a second network packet to the first dual-mode PDCP processing unit. Step 1010 is executed to enable the first dual-mode PDCP processing unit to transmit the second network packet to the first dual-mode RLC processing unit in a PDCP backend network mode. Step 1011 is executed to enable the first dual-mode RLC processing unit to transmit the second network packet to the receiving direct mode communication apparatus through the first transceiver and via the backend network connection in an RLC backend network mode.

Then, step 1012 is executed to enable the second dual-mode RLC processing unit to receive the second network packet from the transmitting direct mode communication apparatus through the second transceiver and via the backend network connection in an RLC backend network mode. Step 1013 is executed to enable the second dual-mode PDCP processing unit to analyze the second network packet in a PDCP backend network mode.

According to the above descriptions, the transmitting direct mode communication apparatus, the receiving direct mode communication apparatus and the communication path switching methods thereof according to the present invention can accomplish switching of the connection more properly and, by modifying the lower-layer protocol, make an improvement on the shortcomings of the complex connection switching procedure and the long interruption time during the connection switching.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A transmitting direct mode communication apparatus, which maintains a backend network connection with a receiving direct mode communication apparatus via a backend network server, the transmitting direct mode communication apparatus comprising:
a transceiver; and
a packet processing module, comprising:
a backend network address processing unit;
a direct mode communication network address processing unit;
a backend network traffic filter template (TFT) processing unit; and
a direct mode communication network TFT processing unit;
wherein the packet processing module is configured to create a direct communication connection with the receiving direct mode communication apparatus via the transceiver, the backend network address processing unit transmits a first network packet to the backend network TFT processing unit, the first network packet comprises a backend network source address and a backend network destination address, the backend network TFT processing unit forwards the first network packet to the direct mode communication network address processing unit, the direct mode communication network address processing unit transforms the backend network source address and the backend network destination address of the first network packet into a direct mode communication network source address and a direct mode communication network destination address, the direct mode communication network TFT processing unit transmits the first network packet to the receiving direct mode communication apparatus through the transceiver and via the direct communication connection according to at least one of the direct mode communication network source address and the direct mode communication network destination address,
the packet processing module is further configured to determine that the direct communication connection is interrupted, and switch the communication with the receiving direct mode communication apparatus from the direct communication connection to the backend network connection which has already been created, the backend network address processing unit further transmits a second network packet to the backend network TFT processing unit after the communication is switched to the backend network connection, the second network packet comprises the backend network source address and the backend network destination address, and the backend network TFT processing unit further transmits the second network packet to the receiving direct mode communication apparatus through the transceiver and via the backend network connection according to at least one of the backend network source address and the backend network destination address.

2. A transmitting direct mode communication apparatus, which maintains a backend network connection with a receiving direct mode communication apparatus via a backend network server, the transmitting direct mode communication apparatus comprising:
a transceiver; and
a packet processing module, comprising:
a backend network address processing unit;
a direct mode communication network address processing unit;
a backend network traffic filter template (TFT) processing unit; and
a direct mode communication network TFT processing unit;
wherein the packet processing module is configured to create a direct communication connection with the receiving direct mode communication apparatus via the transceiver, the backend network address processing unit transmits a first network packet to the direct mode communication network address processing unit, the first network packet comprises a backend network source address and a backend network destination address; the direct mode communication network address processing unit transforms the backend network source address and the backend network destination address of the first network packet into a direct mode communication network source address and a direct mode communication network destination address respectively, the direct mode communication network TFT processing unit transmits the first network packet to the receiving direct mode communication apparatus through the transceiver and via the direct communication connection according to at least one of the direct mode communication network source address and the direct mode communication network destination address,
the packet processing module is further configured to determine that the direct communication connection is interrupted, and switch the communication with the receiving direct mode communication apparatus from the direct communication connection to the backend network connection which has already been created, the backend network address processing unit further transmits a second network packet to the backend network TFT processing unit after the communication is switched to the backend network connection, the second network packet comprises the backend network source address and the backend network destination address, and the backend network TFT processing unit further transmits the second network packet to the receiving direct mode communication apparatus through the transceiver and via the backend network connection according to at least one of the backend network source address and the backend network destination address.

3. A receiving direct mode communication apparatus, which maintains a backend network connection with a transmitting direct mode communication apparatus via a backend network server, the receiving direct mode communication apparatus comprising:
a transceiver; and
a packet processing module, comprising:
a backend network address processing unit; and
a direct mode communication network address processing unit;
wherein the packet processing module is configured to create a direct communication connection with the transmitting direct mode communication apparatus via the transceiver, the direct mode communication network address processing unit receives a first network packet from the transmitting direct mode communication apparatus through the transceiver and via the direct communication connection, addresses of the first network packet comprise a direct mode communication network source address and a direct mode communication network destination address, the direct mode communication network address processing unit transforms the direct mode communication network source address and the direct mode communication network destination address of the first network packet into a backend network source address and a backend network destination address respectively, the backend network address processing unit analyzes the first network packet according to at least one of the backend network source address and the backend network destination address, the packet processing module is further configured to communicate with the transmitting direct mode communication apparatus via the backend network connection, which has already been created, after the direct communication connection is interrupted, the backend network address processing unit further receives a second network packet through the transceiver and via the backend network connection after the direct communication connection is interrupted, addresses of the second network packet comprise the backend network source address and the backend network destination address, and the backend network address processing unit analyzes the second network packet according to at least one of the backend network source address and the backend network destination address.

\* \* \* \* \*